United States Patent
Reid

(10) Patent No.: US 9,992,427 B2
(45) Date of Patent: *Jun. 5, 2018

(54) FACILITATING DETECTION, PROCESSING AND DISPLAY OF COMBINATION OF VISIBLE AND NEAR NON-VISIBLE LIGHT

(71) Applicant: AT&T Intellectual Property I, L.P., Atlanta, GA (US)

(72) Inventor: Dylan C. Reid, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/412,322

(22) Filed: Jan. 23, 2017

(65) Prior Publication Data

US 2017/0134633 A1 May 11, 2017

Related U.S. Application Data

(63) Continuation of application No. 13/971,520, filed on Aug. 20, 2013, now Pat. No. 9,591,234.

(51) Int. Cl.
*H04N 5/30* (2006.01)
*H04N 5/235* (2006.01)
*H04N 5/33* (2006.01)

(52) U.S. Cl.
CPC ......... *H04N 5/2356* (2013.01); *H04N 5/2354* (2013.01); *H04N 5/30* (2013.01); *H04N 5/332* (2013.01)

(58) Field of Classification Search
CPC .... H04N 5/2356; H04N 5/2354; H04N 5/332; H04N 5/30

(Continued)

(56) References Cited

U.S. PATENT DOCUMENTS 6,024,455 A 2/2000 O'Neill et al.
6,203,069 B1 3/2001 Outwater et al.
(Continued)

FOREIGN PATENT DOCUMENTS

EP 1624671 2/2006
EP 1986442 10/2008
(Continued)

OTHER PUBLICATIONS

Blackman, "Imveurope", On a different wavelength—Non-Visible Imaging—Imaging and Machine Vision Europe; published online; 7 pages, Feb./Mar. 2010. retreived May 9, 2013.

(Continued)

*Primary Examiner* — Allen Wong
(74) *Attorney, Agent, or Firm* — Amin, Turocy & Watson, LLP

(57) ABSTRACT

A digital camera accesses, processes and displays a combination image composed of visible light and near non-visible ("NNV") light. A method can include accessing, by a digital camera, raw data having first information associated with a first electromagnetic spectrum range and second information associated with a second electromagnetic spectrum range. The first electromagnetic spectrum range is substantially within the visible spectrum and the second electromagnetic spectrum range is substantially within the NNV spectrum. The method can also include optimizing the raw data for the visible spectrum, thereby generating a first visual image representation, and optimizing the raw data for the NNV spectrum, thereby generating a second visual image representation. The method can also include combining the first visual image representation and the second visual image representation to generate a combination image. The digital camera can then initiate the display of the combination image.

20 Claims, 23 Drawing Sheets
(11 of 23 Drawing Sheet(s) Filed in Color)

(58) Field of Classification Search
USPC .......................................................... 348/162
See application file for complete search history.

(56) References Cited

U.S. PATENT DOCUMENTS

| | | | |
|---|---|---|---|
| 6,832,728 | B2 | 12/2004 | Kennedy |
| 7,126,665 | B2 | 10/2006 | Iida |
| 7,305,103 | B2 | 12/2007 | Turner et al. |
| 7,315,629 | B2 | 1/2008 | Alasia et al. |
| 7,679,672 | B2 | 3/2010 | Chua et al. |
| 7,744,130 | B2 | 6/2010 | Zazzu et al. |
| 8,350,723 | B2 | 1/2013 | Serex |
| 8,408,468 | B2 | 4/2013 | Van Horn et al. |
| 8,432,433 | B2 | 4/2013 | Gabura |
| 2004/0264796 | A1 | 12/2004 | Turner et al. |
| 2006/0066738 | A1 | 3/2006 | Hershey et al. |
| 2006/0082679 | A1 | 4/2006 | Chua et al. |
| 2007/0183657 | A1* | 8/2007 | Kidono ............... G06K 9/2018 382/162 |
| 2008/0002035 | A1* | 1/2008 | Yoshida ............... G06F 21/10 348/222.1 |
| 2011/0084126 | A1 | 4/2011 | Fleming et al. |
| 2011/0187558 | A1 | 8/2011 | Serex |
| 2012/0147243 | A1* | 6/2012 | Townsend ............ H04N 9/045 348/333.02 |
| 2012/0207401 | A1 | 8/2012 | Archer |
| 2012/0281987 | A1 | 11/2012 | Schenk et al. |

FOREIGN PATENT DOCUMENTS

| | | |
|---|---|---|
| EP | 2408193 | 1/2012 |
| WO | 0182593 | 11/2001 |
| WO | 2006036398 | 4/2006 |
| WO | 2006060746 | 6/2006 |
| WO | 2008085679 | 7/2008 |
| WO | 2009128065 | 10/2009 |

OTHER PUBLICATIONS

Greenemeier, "Invisible Quick-Response Codes (the Square Ones) Could Thwart Counterfeiting," Scientific American, Sep. 11, 2012, 4 pages, <http://blogs.scientificamerican.com/observations/2012/09/11/invisible-quick-response-codes-the-square-ones-could-thwart-counterfeiting/> Last accessed May 23, 2013.

Wikipedia. "Full-spectrum photography", published online at [http://en.wikipedia.org/wiki/Full-spectrum_photography], retreived May 9, 2013, 5 pages.

"IR Filters," published online at [www.maxmax.com/axnitefilters.htm]; 6 pages. Last accessed May 9, 2013.

"Light and Optics," published online at [sci-toys.com/scitoys/scitoys/light/invisible/invisible.html]; 16 pages. Last accessed May 9, 2013.

"Visible and Flourescent Invisible Detection Products," published online at [www.sirchie.com]; 12 pages. Last accessed May 9, 2013.

Font, "UV Tattoos: Business by Day, Party by Night," Technology Guide. May 17, 2013, 10 pages, <http://www.technologyguide.com/feature/uv-tattoos-business-by-day-party-by-night/> Last accessed May 23, 2013.

Robbebbolt, "The VOLANTE" USD professor develops invisible QR codes—Volante (University of South Dakota); published online at [www.volanteonline.com/news/usd-professor-develops-invisible-qr-codes/article_11a00eea-7b2d-11e2-b614-0019bb30f31a.html]; Feb. 20, 2013; 3 pages.

Guidi, et al., "GUI-Aided NIR and Color Image Blending," 15th IEEE Mediterranean Electrotechnical Conference, Jan. 10, 2010, pp. 1111-1116, IEEE, Switzerland.

Dwyer, et al., "Real Time Implementation of Image Alignment and Fusion," Proceedings of SPIE, Intelligent Vehicle Highway Systems, Oct. 25, 2014, pp. 85-93, vol. 5612, Issue 1, U.S.

Zhang, et al., "Enhancing Photographs with Near Infrared Images," 2008 IEEE Conference on Computer Vision and Pattern Recognition, Jun. 1, 2008, pp. 1-8, IEEE, Singapore.

International Search Report for PCT Application No. US14/49780 dated Oct. 16, 2014, 6 Pages.

Office Action for European Application No. 14758011.2 dated Mar. 31, 2016, 9 Pages.

Office Action for U.S. Appl. No. 13/971,520 dated Jul. 15, 2016, 13 pages.

Office Action for U.S. Appl. No. 13/971,520 dated Jan. 11, 2016, 31 pages.

* cited by examiner

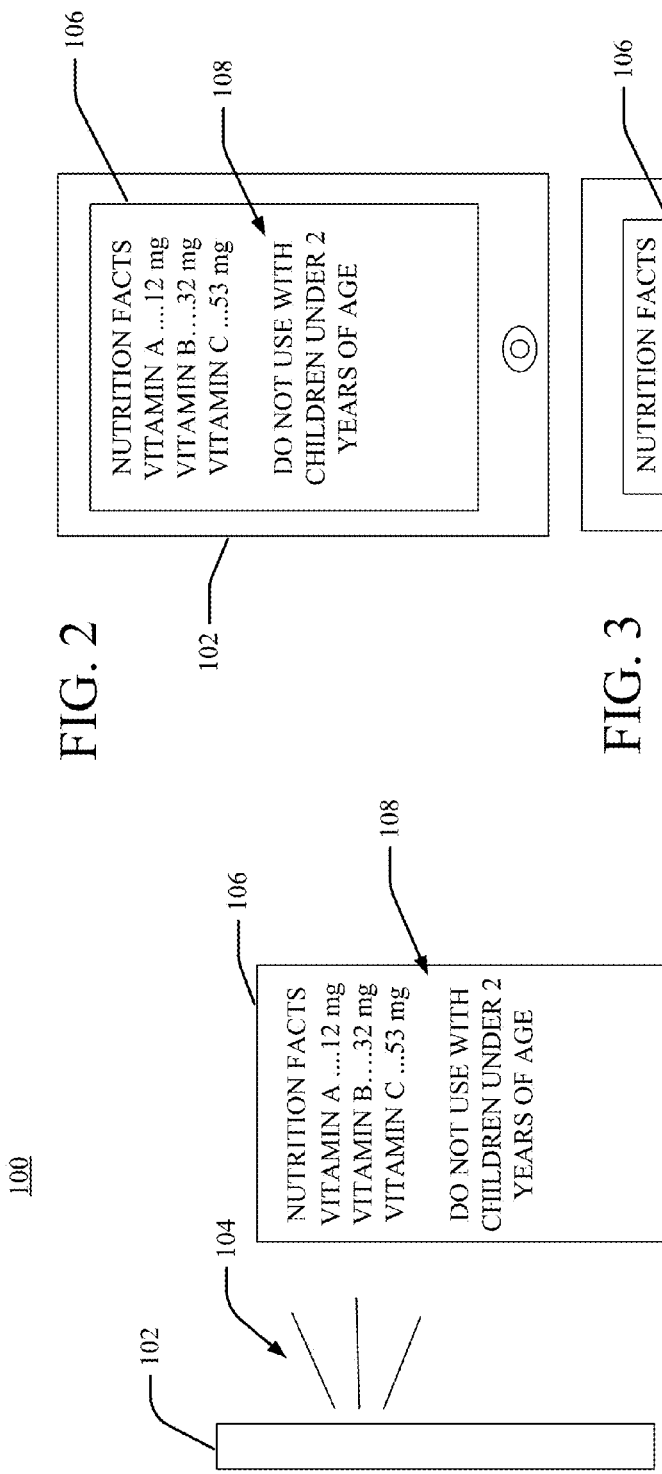

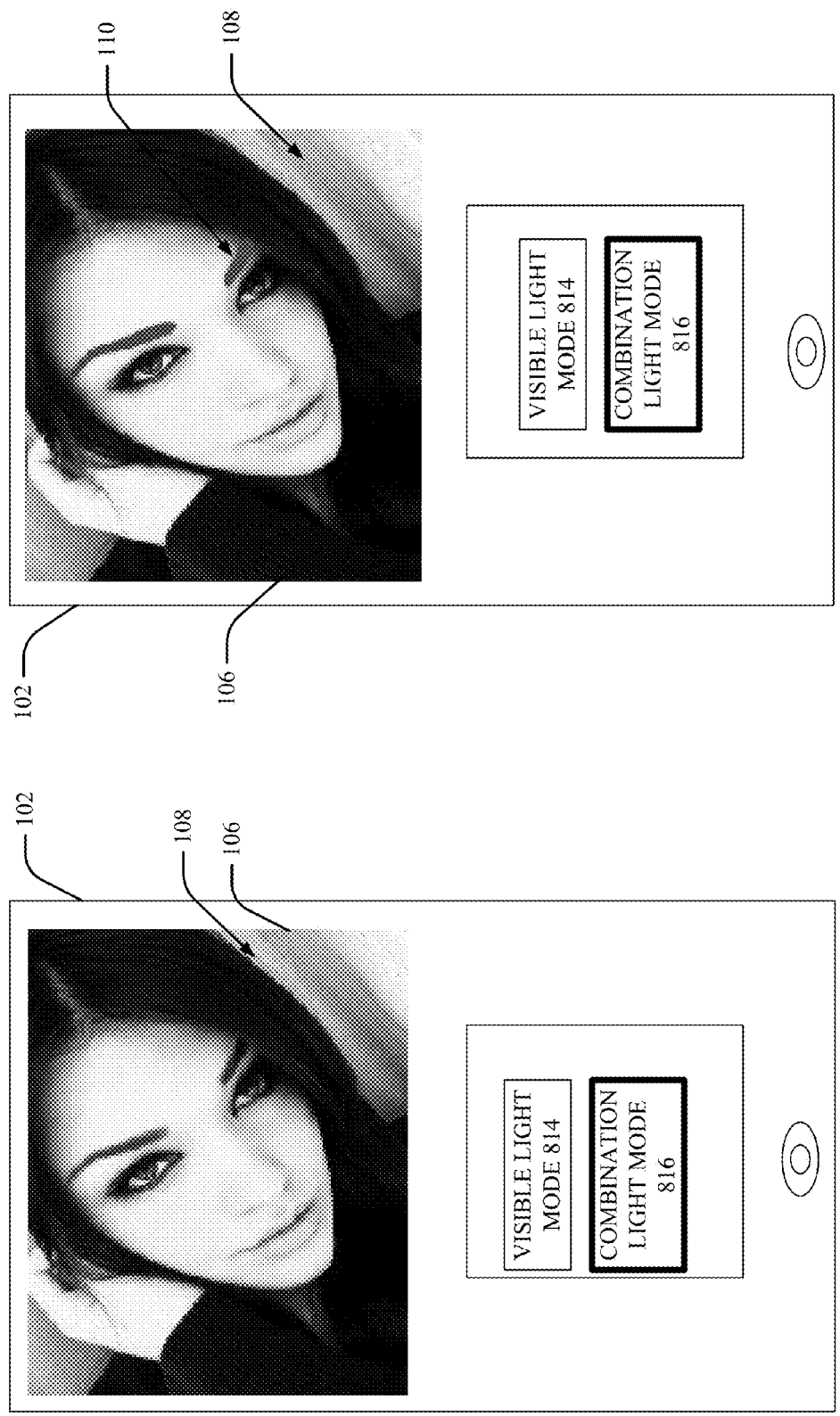

FACILITATING DETECTION, PROCESSING AND DISPLAY OF COMBINATION OF VISIBLE AND NEAR NON-VISIBLE LIGHT

CROSS-REFERENCE TO RELATED APPLICATION

This patent application is a continuation of, and claims priority to, U.S. patent application Ser. No. 13/971,520 (now U.S. Pat. No. 9,591,234), filed on Aug. 20, 2013, and entitled "FACILITATING DETECTION, PROCESSING AND DISPLAY OF COMBINATION OF VISIBLE AND NEAR NON-VISIBLE LIGHT." The entirety of the foregoing application is hereby incorporated by reference herein.

TECHNICAL FIELD

The subject disclosure relates generally to image processing, and specifically to facilitating detection, processing and display of combination of visible and near non-visible (NNV) light.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 illustrates an example block diagram of a system including a digital camera configured to process and display combination visible and NNV light, and an object bearing materials configured to reflect NNV light in accordance with embodiments described herein.

FIG. 2 illustrates an example block diagram of a digital camera display region displaying an image representation of visible light reflected from the object of FIG. 1 in accordance with embodiments described herein.

FIG. 3 illustrates an example block diagram of a digital camera display region displaying a combination image composed of visible light and NNV light reflected from the object of FIG. 2 in accordance with embodiments described herein.

FIG. 13 illustrates an example digital camera display region displaying an image generated from processing and displaying visible light information in accordance with embodiments described herein.

FIG. 14 illustrates an example digital camera display region displaying an image generated from processing and displaying visible light information and NNV light information in accordance with embodiments described herein.

FIGS. 23, 24, 25, 26, 27 illustrate example flowcharts of methods that facilitate detection, processing and/or display of a combination image composed of visible and NNV light in accordance with embodiments described herein.

Figure 28:
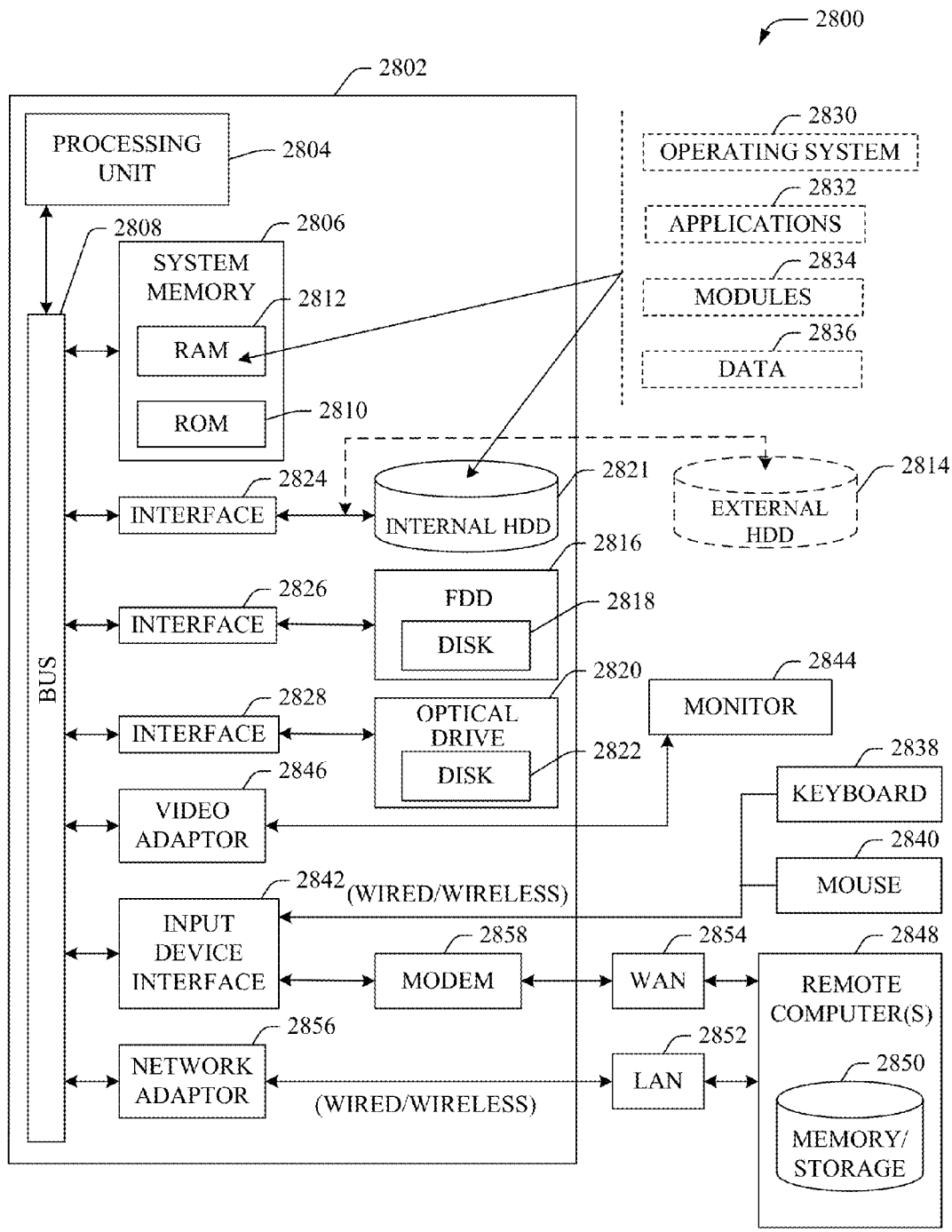

FIG. 28 illustrates a block diagram of a computer operable to facilitate detection, processing and/or display of combination visible and NNV light in accordance with embodiments described herein.

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (femto cell device)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "mobile device," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies. Further, the term "femto" and "femto cell" are used interchangeably, and the terms "macro" and "macro cell" are used interchangeably.

Embodiments described herein can enable multiple layers of information (visible light information and NNV light information) to be processed and concurrently displayed in a manner perceptible to the human eye. As used herein, the term "visible spectrum" can mean the portion of the electromagnetic spectrum that is visible to, or can be detected by, the human eye and/or the portion of the electromagnetic spectrum having wavelengths between approximately 390 nanometers (nm) and approximately 700 nm. As used herein, the term "visible light" can mean the electromagnetic radiation in the visible spectrum and/or the electromagnetic radiation having wavelengths between approximately 390 nm and approximately 700 nm.

As used herein, the terms "non-visible spectrum" or "invisible spectrum" can mean the portion of the electromagnetic spectrum that is not visible to, or not detectable by, the human eye and/or the portion of the electromagnetic spectrum having wavelengths less than approximately 365 nm and/or greater than approximately 725 nm. As used herein, the terms "non-visible light" or "invisible light" can mean the electromagnetic radiation in the non-visible spectrum or the invisible spectrum and/or the electromagnetic radiation having wavelengths less than approximately 365 nm and/or greater than approximately 725 nm.

As used herein, the term "NNV spectrum" can mean the portion of the electromagnetic spectrum having wavelengths between approximately 389 nm and approximately 365 nm and/or having wavelengths between approximately 701 nm and approximately 725 nm. As used herein, the term "NNV" can mean the electromagnetic radiation in the NNV spectrum and/or the electromagnetic radiation having wavelengths between approximately 389 nm and approximately 365 nm and/or having wavelengths between approximately 701 nm and approximately 725 nm.

In some embodiments, in lieu of the above wavelength ranges, the range of wavelengths for non-visible light (or non-visible spectrum) and invisible light (or invisible spectrum) can be greater than approximately 710 nm and less than approximately 380 nm. In this embodiment, the range of wavelengths for NNV light (or NNV spectrum) can be between approximately 701 and approximately 710 nm and/or between approximately 389 and approximately 380 nm.

In one embodiment, a method can include: accessing, by a digital camera comprising a processor, raw data having both first information associated with a first electromagnetic spectrum range and second information associated with a second electromagnetic spectrum range, the first electromagnetic spectrum range substantially within a visible spectrum and the second electromagnetic spectrum range substantially within an NNV spectrum. The method can also include optimizing the raw data for the visible spectrum, thereby generating a first visual image representation; and optimizing the raw data for the NNV spectrum, thereby generating a second visual image representation.

In another embodiment, a computer-readable storage medium stores computer-executable instructions that, when executed by a processor of a digital camera, cause the digital camera to perform operations. The operations can include: accessing raw data having both first information associated with a first electromagnetic spectrum range and second information associated with a second electromagnetic spectrum range, the first electromagnetic spectrum range substantially within a visible spectrum and the second electromagnetic spectrum range substantially within an NNV spectrum. The operations can also include: optimizing the raw data for the visible spectrum, thereby generating a first visual image representation, and optimizing the raw data for the NNV spectrum, thereby generating a second visual image representation. The operations can also include combining the first visual image representation and the second visual image representation to generate a combination image.

In another embodiment, a digital camera includes a memory configured to store computer-executable instructions, and a processor, communicatively coupled to the memory, and configured to facilitate execution of computer-executable instructions to perform operations. The operations can include accessing raw data having both first information associated with a first electromagnetic spectrum range and second information associated with a second electromagnetic spectrum range, the first electromagnetic spectrum range substantially within a visible spectrum and the second electromagnetic spectrum range substantially within an NNV spectrum. The operations can also include: optimizing the raw data for the visible spectrum, thereby generating a first visual image representation, and optimizing the raw data for the NNV spectrum, thereby generating a second visual image representation. The operations can also include combining the first visual image representation and the second visual image representation to generate a combination image.

One or more embodiments can advantageously process and display both visible light information and NNV information to provide an enhanced amount of information provided to consumers using or personnel associated with products. The information can be provided from any number of different types of mobile devices (e.g., digital cameras, smart phones, tablets, automobiles) via still photograph or video. Further, visible light and/or NNV information can be transmitted between two or more mobile devices over any number of different types of wired or wireless networks. Thus, the set of information that can be shared between users can be significantly enhanced via the embodiments described herein.

One or more embodiments advantageously utilize existing complementary metal oxide semiconductor (CMOS) technology in existing mobile devices (e.g., existing digital cameras in lieu of modified cameras/devices having special hardware filters for processing NNV light information and visible information) enhanced by the technology described herein to facilitate widespread augmented reality applications for users. In some embodiments, software can be employed in the digital camera instead of hardware (e.g., a picture can be digitally filtered with software to keep the visible light information and the NNV light information in a picture).

Embodiments can be employed to facilitate numerous different applications including, but not limited to, public safety applications, product logistics, public sector services, industrial applications and the like. For example, one or more of the embodiments can be employed to facilitate product labeling (e.g., hidden in plain sight messages, advertisements, quick response (QR) codes), product re-branding/co-branding (e.g., product packaging including special promotion information), public safety (e.g., autonomous vehicles and road hazard warnings, panic stops, temporary traffic re-routing information), cosmetics and modeling (e.g., special makeup and temporary tattoos that are not apparent to the human, naked eye) and/or television concurrent multi-program display (e.g., concurrent display of multiple television programs).

FIG. 1 illustrates an example block diagram of a system including a digital camera configured to process and display combination visible and NNV light, and an object bearing materials configured to reflect NNV light. System 100 includes object 106 bearing visible light information 108 and NNV light information (not shown), and digital camera 102 configured to emit light 104. The embodiment shown illustrates object 106 without the NNV light information to illustrate the manner in which object 106 appears to the human, naked eye, depicting only visible light information 108; however, object 106 also NNV light information.

The NNV light information can include one or more materials (or combinations thereof) capable of reflecting electromagnetic radiation in the NNV spectrum in response to the incidence of light 104 on the one or more materials. For example, the material can be a nano material configured to reflect NNV light information in response to light 104 from digital camera 102 while being substantially NNV to the human, naked eye. In some embodiments, nano material can be included in a coating applied to object 106. The nano material can be configured and/or designed to reflect light in the NNV spectrum. In various embodiments, different nano material can be designed based on varying the size and placement of nano particles (e.g., how closely packed the particles are to one another can determine the particular NNV light reflected).

As used herein, the term "visible light information" can mean information about light within the visible spectrum. For example, visible light information can be a color detectable by the human eye. As such, visible light information 108 of object 106 can be information perceptible to the human eye. For example, text, a solid color and/or a pattern having one or more colors within the visible spectrum.

System 100 includes object 106 bearing visible light information 108 and NNV light information (not shown) and digital camera 102 configured to emit light 104 causing NNV light information to be reflected from object 106.

FIG. 2 illustrates an example block diagram of a digital camera display region displaying an image representation of visible light reflected from the object of FIG. 1 in accordance with embodiments described herein. Digital camera 102 can operate in two different modes: a first mode in which digital camera 102 processes and displays only visible light information 108, and a second mode in which digital camera 102 processes and concurrently displays both visible light information 108 and NNV light information 110. In the embodiment shown, digital camera 102 is configured to operate in the first mode and digital camera display region 106 of digital camera 102 displays only visible light information 108 of object 106.

FIG. 3 illustrates an example block diagram of a digital camera display region displaying a combination image composed of visible light and NNV light reflected from the object of FIG. 2 in accordance with embodiments described herein. In the embodiment shown, digital camera 102 is configured to operate in the second mode and digital camera display region 106 of digital camera 102 concurrently displays both visible light information 108 and NNV light information 110 of object 106.

As shown, product logistic information (e.g., serial number) can be provided on object 106 for use by personnel. For example, personnel can be associated with inventory control, material handling, product placement or the like. In other embodiments, the information can be poison control center information, for example. Any number of different types of NNV light information 110 can be provided on different objects.

While the embodiments shown in FIGS. 1, 2 and 3 describe retrieval of NNV light information by digital camera 102 in response to light 104 emitted from digital camera 102, in various embodiments, digital camera 102 need not emit light 104 prior to processing and/or display of combination visible light information and NNV light information. Instead, in various embodiments, digital camera 102 can be configured to access visible light information and/or NNV light information previously-stored or otherwise previously retrieved and need not emit light 104 prior to processing and display.

Figure 4:
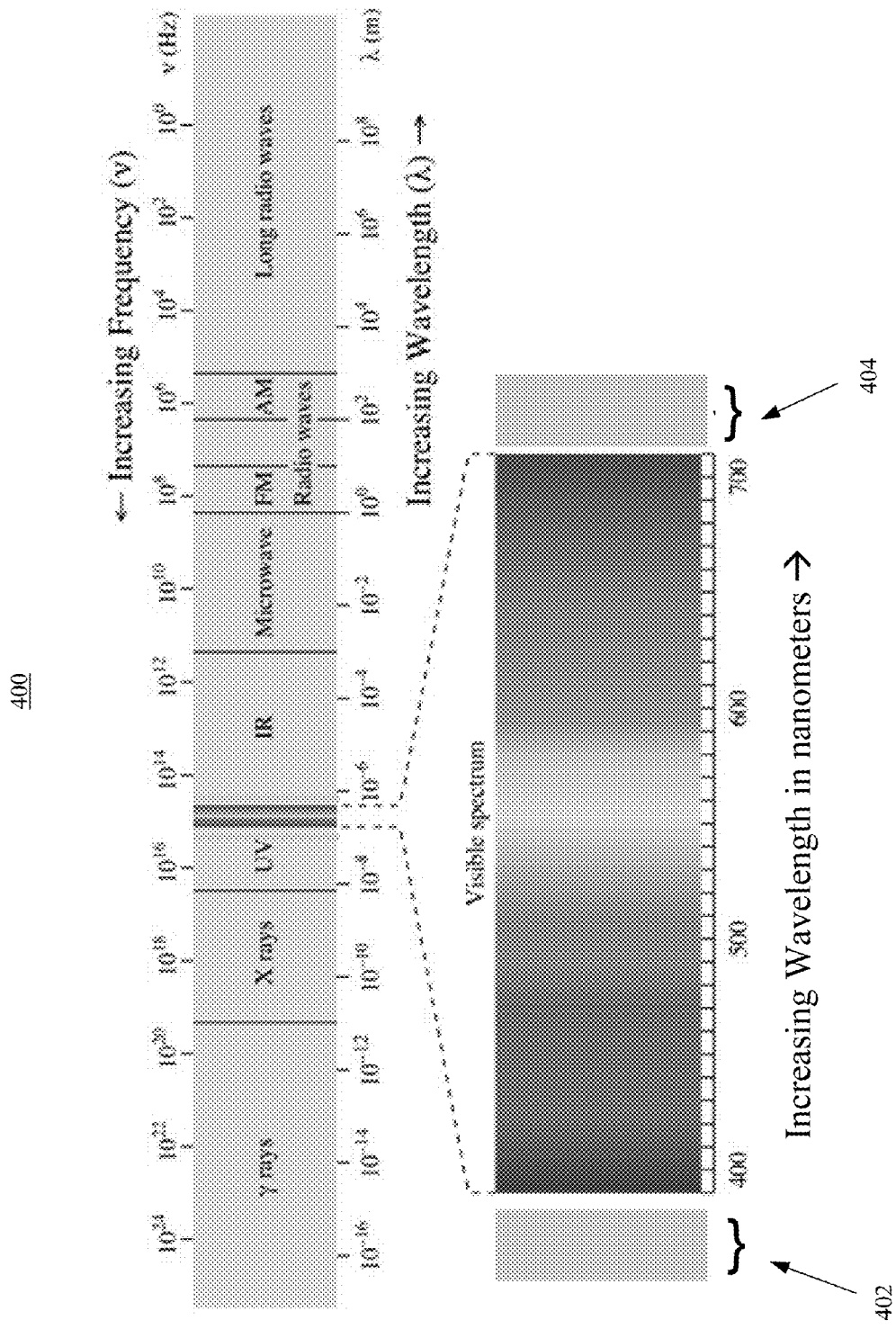
FIG. 4 illustrates an example schematic diagram of the electromagnetic spectrum including the visible spectrum and the NNV spectrum in accordance with embodiments described herein.

FIG. 4 illustrates an example schematic diagram of an electromagnetic spectrum. Electromagnetic spectrum 400 ranges from x-ray waves to long radio waves and includes the visible spectrum between 390 nm and 700 nm, and NNV spectrum 402, 404. As described, NNV spectrum 402 can include the portion of electromagnetic spectrum 400 having wavelengths between approximately 389 nm and approximately 365 nm while NNV spectrum 404 can include the portion of electromagnetic spectrum 400 having wavelengths between approximately 701 nm and approximately 725 nm.

In some embodiments, NNV spectrum 402 can include the portion of electromagnetic spectrum 400 having wavelengths between approximately 389 nm and approximately 380 nm and/or NNV spectrum 404 can include the portion of electromagnetic spectrum 400 having wavelengths between approximately 701 nm and approximately 710 nm.

Figure 5:
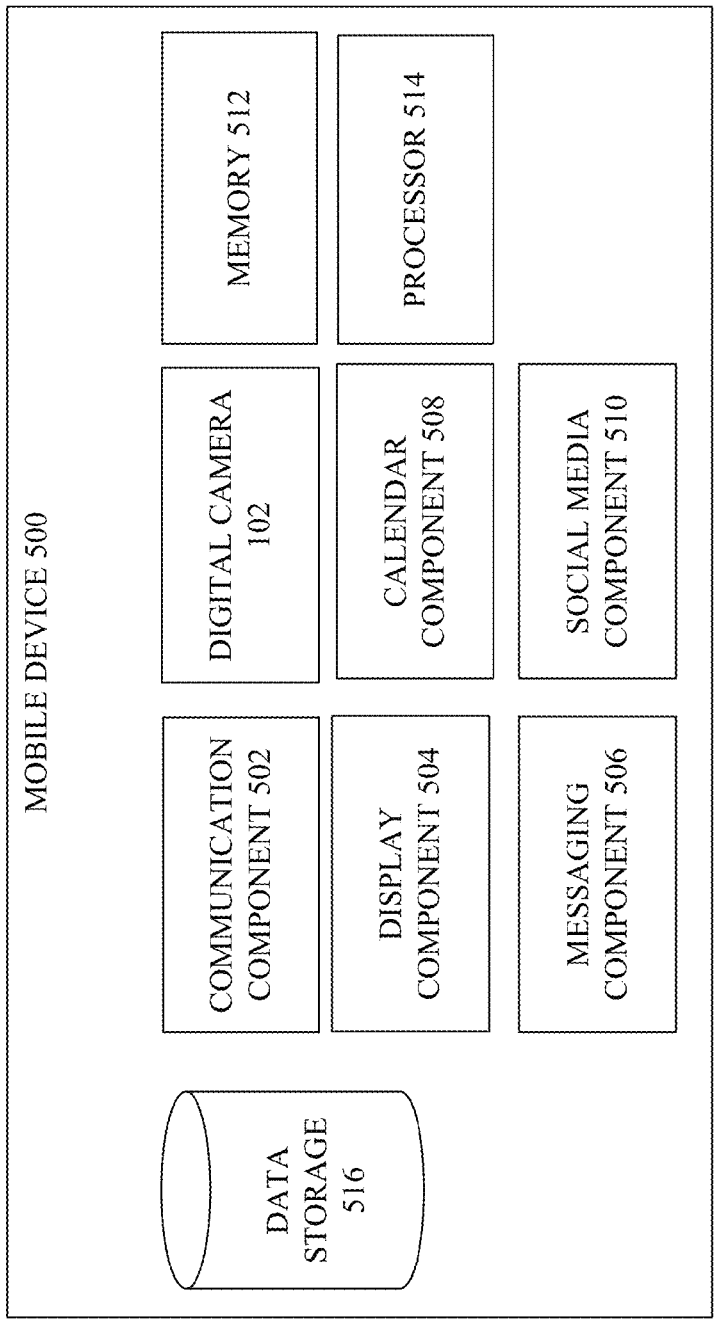
FIG. 5 illustrates an example block diagram of a mobile device having a digital camera configured to facilitate processing for and display of combination images generated from visible light information and NNV light information in accordance with embodiments described herein.

Turning now to FIG. 5, illustrated is an example block diagram of a mobile device having a digital camera configured to facilitate processing for and display of combination images generated from visible light information and NNV light information in accordance with embodiments described herein. Repetitive description of like elements employed in respective embodiments of systems and/or apparatus described herein are omitted for sake of brevity.

Mobile device 500 can include communication component 502, display component 504, messaging component 506, digital camera 102, calendar component 508, social media component 510, memory 512, processor 514 and/or data storage 516. In various embodiments, communication component 502, display component 504, messaging component 506, digital camera 102, calendar component 508, social media component 510, memory 512, processor 514 and/or data storage 516 can be electrically and/or communicatively coupled to one another to perform one or more functions of mobile device 500.

Mobile device 500 can be any mobile device configured to access, process and/or display combination light composed of NNV light information and visible light information. For example, in various embodiments, mobile device 500 can include, but is not limited to, a cellular telephone, a laptop with camera function, a smart phone or the like.

Communication component 502 can transmit and/or receive information to and/or from mobile device 500. For example, in various embodiments, communication component 502 can transmit and/or receive light information at mobile device 500. As such, communication component 502 can include a transmitter and/or receiver in various embodiments. The light information can be visible light information and/or NNV light information in various embodiments. The light information can be transmitted, received and/or otherwise accessed via wireless or wired channel by communication component 502. For example, visible light information or NNV light information can be stored in data storage remote from mobile device and accessed over a channel to which communication component 502 is communicatively coupled. In various embodiments, communication component 502 can also transmit and/or receive any of a number of different types of information including, but not limited to, voice, video, text, data or the like.

Display component 504 can be or include a display apparatus configured to output an electronic image representation of a scene. The scene can include visible light information and/or NNV light information in various embodiments.

Display component 504 can output the electronic image representation in a monochromatic color scheme in some embodiments, a polychromatic color scheme in other embodiments and/or in a combination of a monochromatic color scheme and one or more other colors having a wavelength in the visible spectrum in other embodiments. The manner in which the display component 504 outputs a scene can be dictated by the manner in which mobile device 500 is configured and can change from time to time. For example, in one embodiment, display component 504 can be configured to output the portion of an electronic image representation composed from NNV light information in red color and the portion of the electronic image representation composed from visible light information in grayscale. As such, the NNV light information can be readily apparent to a viewer of the electronic image representation.

In some embodiments, display component 504 can be or include a liquid crystal display (LCD) circuitry and/or functionality. The LCD technology can be or include thin film transistor or In-Plane Switching circuitry and/or functionality. In some embodiments, some embodiments, display component 504 can be or include organic light emitting diode or active matrix organic light emitting diode circuitry and/or functionality. In one embodiment, display component 504 can be any type of display apparatus capable of displaying an image.

Messaging component 506 can include structure, hardware, software and/or functionality configured to initiate or facilitate one or more different types of messaging including, but not limited to, electronic mail, telephone calls, voicemail, text message and the like. Calendar component 510 can include structure, hardware, software and/or functionality configured to provide calendar notifications, store calendar entries and the like. Social media component 512 can include structure, hardware, software and/or functionality configured to initiate or facilitate one or more different types of social media interactions with mobile device 500 including, but not limited to, receipt or transmission of information indicative of social media posts, blogs or the like.

Memory 512 can be a computer-readable storage medium storing computer-executable instructions and/or information for performing the functions described herein with reference to mobile device 500 (or any component of mobile device 500). For example, memory 512 can store computer-executable instructions that can be executed by processor 514 to perform display, processing or other types of functions executed by mobile device 500. Processor 514 can perform one or more of the functions described herein with reference to mobile device 500 (or any component thereof, including digital camera 102). For example, processor 514 can perform image processing functions to generate visual image representations from visible light information and/or NNV light information, to combine different visual image representations into a single combined image, to add color to portions of the combined image associated with visible light information versus NNV light information and/or various different types of image processing functions (e.g., resolution, orientation, picture size, aperture, shutter speed and/or focusing adjustments).

Figure 7:
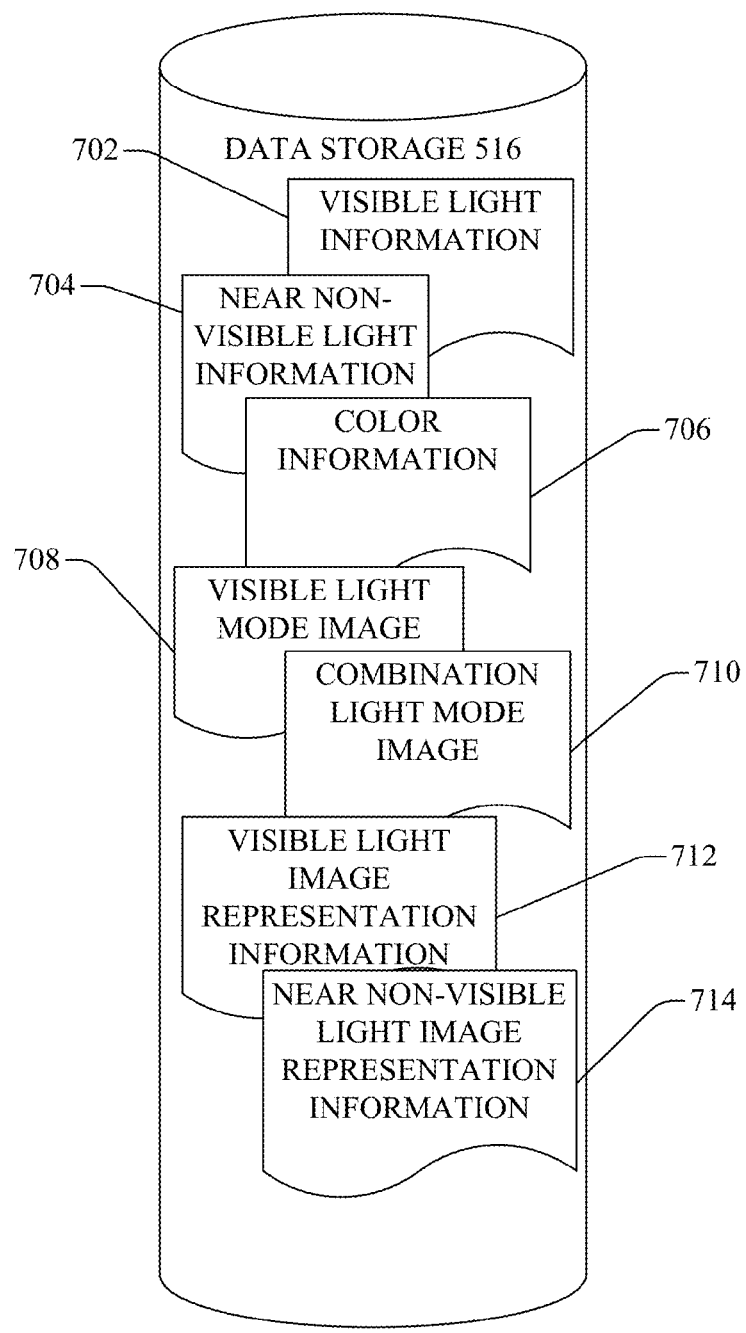
FIG. 7 illustrates an example block diagram of data storage of a digital camera configured to facilitate processing for and display of combination images generated from visible light and NNV light in accordance with embodiments described herein.

Data storage 516 can be described in greater detail with reference to FIG. 7. As shown in FIG. 7, data storage 516 can be configured to store information accessed by, received by and/or processed by digital camera 102 and/or mobile device 500. For example, data storage 516 can store visible light information 702, NNV light information 704, color information 706, a visible light mode image 708, a combination light mode image 710, visible light image representation information 712, NNV light image representation information 714. In some embodiments, a visible light mode image 708 can be information indicative of an image generated based on visible light information, and a combination light mode image 710 can be information indicative of an image generated based on combined visible light information and NNV light information.

Digital camera 102 can be or include the structure, hardware, software and/or functionality of digital camera 102 as described with reference to FIGS. 1, 2 and 3. Digital camera 102 can be as further described with reference to FIGS. 6, 8, 9 and 10.

Figure 6:
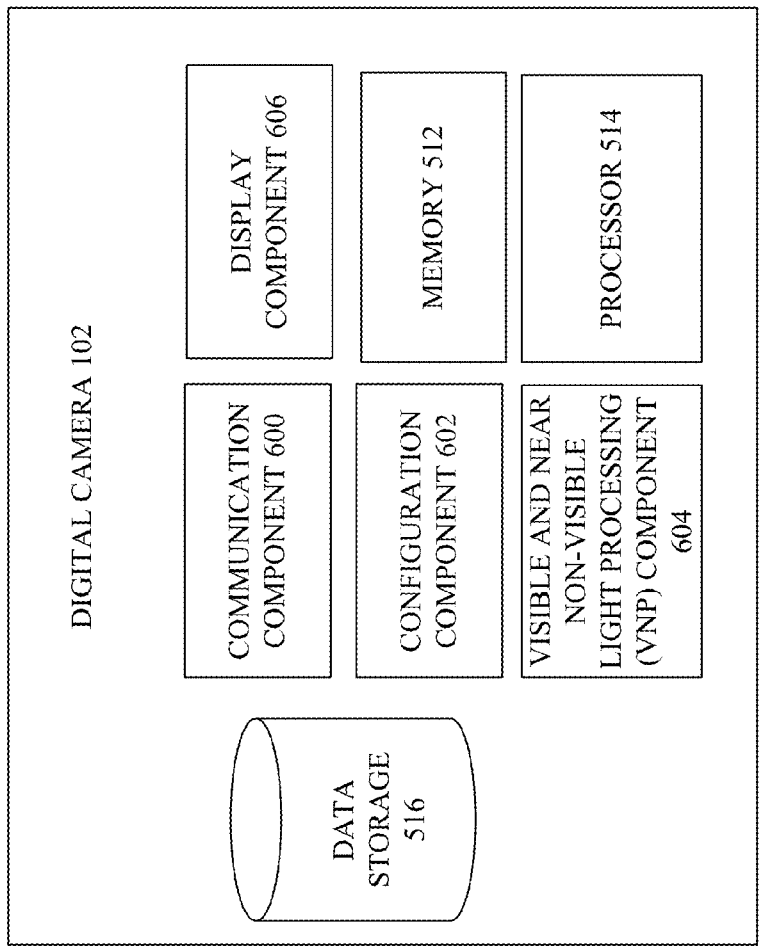
FIG. 6 illustrates an example block diagram of a digital camera configured to facilitate processing for and display of combination images generated from visible light information and NNV light information in accordance with embodiments described herein.
Figure 8:
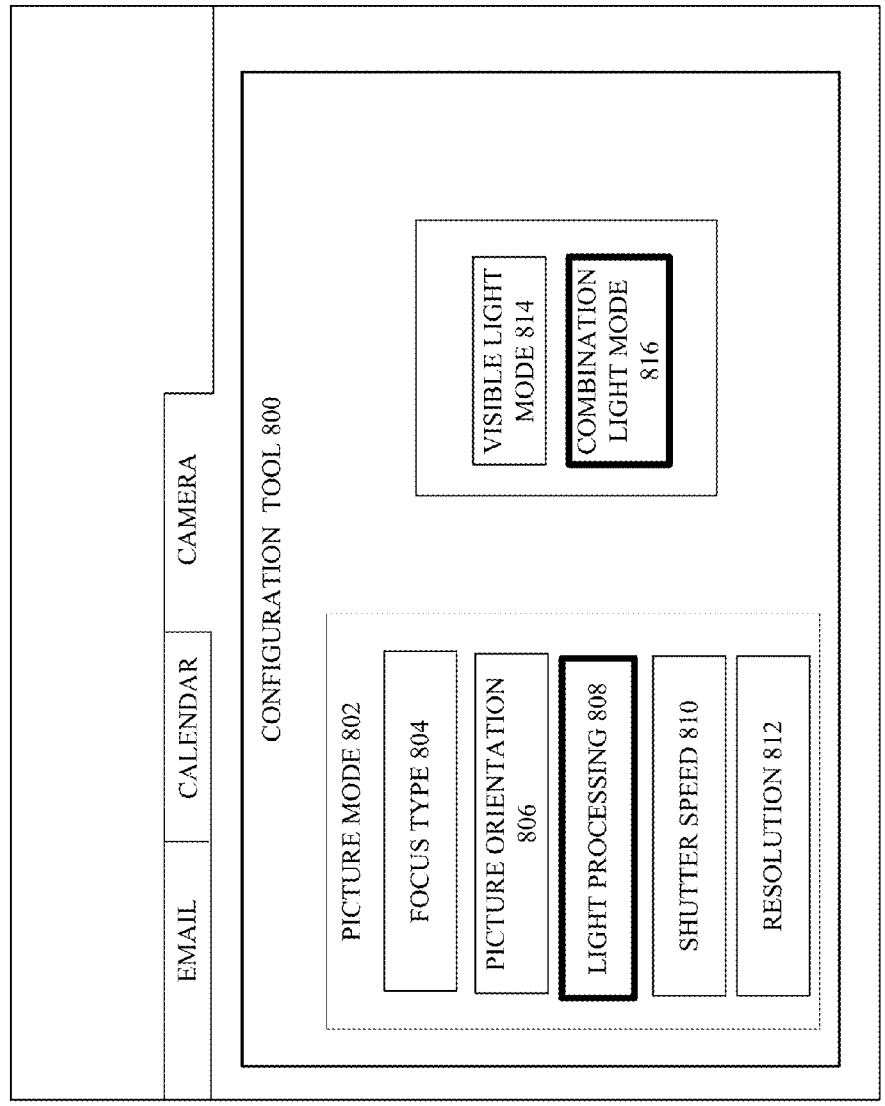
FIG. 8 illustrates an example block diagram of a digital camera display region displaying settings to configure the digital camera to operate in visible light mode and combination light mode in accordance with embodiments described herein.

Turning first to FIGS. 6 and 8, illustrated in FIG. 6 is an example block diagram of a digital camera configured to facilitate processing for and display of combination images generated from visible light information and NNV light information in accordance with embodiments described herein. FIG. 8 illustrates an example block diagram of a digital camera display region displaying settings to configure the digital camera to operate in visible light mode and combination light mode in accordance with embodiments described herein. Repetitive description of like elements employed in respective embodiments of systems and/or apparatus described herein are omitted for sake of brevity.

As shown in FIG. 6, digital camera 102 can include communication component 600, configuration component 602, visible and NNV light processing (VNP) component 604, display component 606, memory 512, processor 514 and/or data storage 516. In various embodiments, one or more of communication component 600, configuration component 602, VNP component 604, display component 606, memory 512, processor 514 and/or data storage 516 can be electrically and/or communicatively coupled to one another to perform one or more functions of digital camera 102.

While the embodiment of FIG. 6 illustrates a display component 606, and mobile device 500 illustrates mobile device 500 including digital camera 102, in some embodiments, digital camera 102 can have a display component 606 that is distinct from display component 106 (or, in some embodiments, digital camera 102 does not include display component 606 and can be communicatively coupled to display component 106 in lieu of display component 406). Similarly, while the embodiment of FIG. 6 illustrates communication component 600, in some embodiments, digital camera 102 can have a separate communication component 600 from mobile device 500 (or, in some embodiments, digital camera 102 can include a communication component (e.g., communication component 600) that is separate and distinct from communication component 502).

Communication component 600 can include structure, hardware, software and/or functionality configured to transmit and/or receive and/or access visible light information and/or NNV light information in various embodiments. The information can be transmitted, received and/or accessed over wireless or wired channels to which digital camera 102 can be communicatively coupled.

With reference to FIGS. 6 and 8, configuration component 602 can include structure, hardware, software and/or functionality to configure various settings to control operation of digital camera 102. As shown in FIG. 8, an example screenshot of display component 606 when configuration component 602 is accessed or activated can include information for controlling the following different types of settings of digital camera 102: picture mode 802, focus type 804 (e.g., autofocus, manual focus), picture orientation 806 (e.g., landscape, portrait, panorama), light processing 808 (e.g., visible light processing, NNV light processing, combination visible and NNV light processing), shutter speed 810 and/or resolution 812.

As shown, in some embodiments, light processing 608 can be selected and at least two modes of operation of digital camera 102 can be displayed: visible light mode 814 and combination light mode 816. In some embodiments, in visible light mode 814, digital camera 102 can be configured to process visible light information and NNV light information but display an image generated from only the visible light information. In other embodiments, in visible light mode 814, digital camera 102 can be configured to process visible light information and display an image generated from only the visible light information.

In some embodiments, in combination light mode 816, digital camera 102 can be configured to process visible light information and NNV light information and display an image generated from both visible light information and NNV light information.

While not shown, in some embodiments, configuration component 402 can configure digital camera 102 in a third mode: NNV light mode. In some embodiments, in NNV light mode, digital camera 102 can be configured to process visible light information and NNV light information but display an image generated from only the NNV light information. In other embodiments, in NNV light mode, digital camera 102 can be configured to process NNV light information and display an image generated from only the NNV light information.

Figure 9:
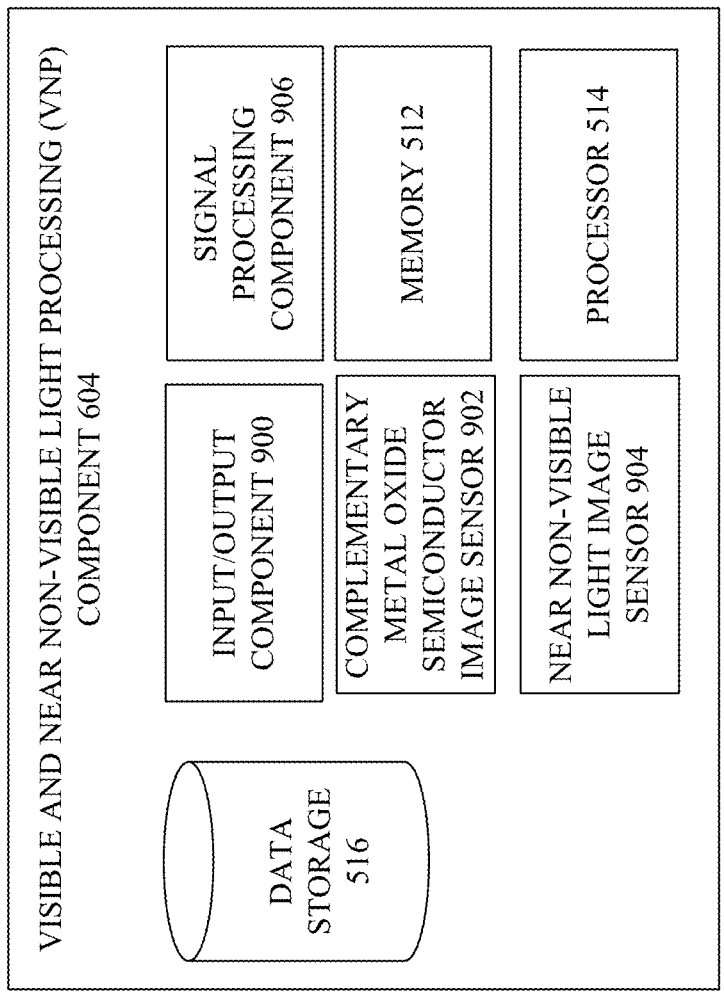
FIG. 9 illustrates an example block diagram of a visible and NNV light processing component of a digital camera configured to facilitate processing for and display of combination images generated from visible light information and NNV light information in accordance with embodiments described herein.
Figure 10:
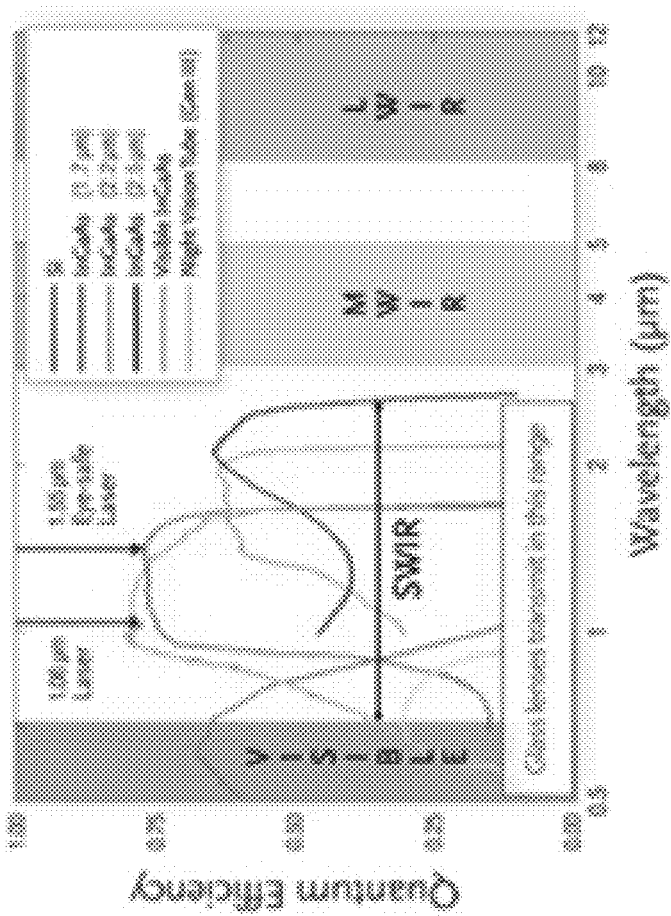
FIG. 10 illustrates a graph of quantum efficiency versus wavelength for silicon, indium gallium arsenide (InGaAs), visible InGaAs and a night vision tube as relates to near infrared and infrared light in the NNV spectrum in accordance with embodiments described herein.

VNP component 604 can be described in greater detail with reference to FIGS. 9 and 10. As shown, FIG. 9 illustrates an example block diagram of a VNP component of a digital camera configured to facilitate processing for and display of combination images generated from visible light information and NNV light information in accordance with embodiments described herein.

VNP component 604 can include input/output (I/O) component 900, complementary metal oxide semiconductor (CMOS) image sensor 902, NNV light image sensor 904, signal processing component 906, memory 512, processor 514 and/or data storage 516. In various embodiments, one or more of I/O component 900, CMOS image sensor 902, NNV light image sensor 904, signal processing component 906, memory 512, processor 514 and/or data storage 516 can be electrically and/or communicatively coupled to one another to perform one or more functions of VNP component 604. Repetitive description of like elements employed in respective embodiments of systems and/or apparatus described herein are omitted for sake of brevity.

In various embodiments, VNP component 604 can perform numerous different types of functions to process and facilitate display of visible light information and/or NNV light information, including processing and facilitating display of combination light information composed of visible light information and NNV light information.

I/O component 900 can receive and/or access light information captured by digital camera 102 and/or access by digital camera 102. I/O component 900 can also output an electronic image representation of visible light information, NNV light information and/or combination light information that can be displayed by display component 106 or display component 606. I/O component 900 can format the information input and/or output for use by VNP component 404, display component 106 and/or display component 606 in various embodiments. For example, the information can be formatted according to configuration settings and/or to comply with any number of different image processing and/or display standards.

CMOS image sensor 902 can convert visible light information received at VNP component 604 to electrons, and determine an accumulated charge of one or more cells of the CMOS image sensor 902. CMOS image sensor 902 can convert the charge to pixel values at different locations corresponding to different positions in an electronic image representation composed from visible light information. In some embodiments, digital camera 102 can be configured to map determined pixel values for an electronic image representation from visible light information to pixel values indicative of monochromatic color schemes or grayscale color schemes. In other embodiments, the electronic image representation can include colors indicative of the pixel values determined from the accumulate charge.

While one CMOS image sensor 902 and one NNV light image sensor 904 is shown in FIG. 9, in various embodiments, numerous CMOS image sensors and/or numerous NNV light image sensors can be included in VNP component 604 and such embodiments are envisaged herein. Further, in some embodiments, in lieu of or in addition to CMOS image sensor 902, VNP component 604 can include one or more charge-coupled device (CCD) image sensors configured to process light in the visible spectrum.

NNV light image sensor 904 can include one or more structures and/or materials configured to detect electromagnetic radiation in the NNV spectrum. In some embodiments, NNV light image sensor 904 can be or include a CCD image sensor that can detect near infrared light (or infrared light).

In some embodiments, NNV light image sensor 904 can be any digital imaging sensor capable of detecting electromagnetic radiation in NNV spectrum 402 and/or NNV spectrum 404. In some embodiments, NNV light image sensor 904 is a conventional digital imaging sensor included in conventional digital cameras.

In some embodiments, one or more sensors in VNP component 904 can include one or more photodiodes composed of InGaAs (or other materials), which can detect near infrared light in the NNV spectrum. FIG. 10 illustrates a graph of quantum efficiency versus wavelength for silicon, InGaAs, visible InGaAs and a night vision tube as relates to near infrared and infrared light in the NNV spectrum in accordance with embodiments described herein. The graph shows the visible, short wave infrared (SWIR), mid-wavelength infrared (MWIR) and long-wavelength infrared (LWIR) regions of the electromagnetic spectrum. As such, silicon has the highest quantum efficiency for detection of visible light. By contrast, visible InGaAs has the highest quantum efficiency of detection of 1.06 micron laser-generated SWIR and such efficiency occurs at approximately 0.7 microns. InGaAs has the highest quantum efficiency for detection of 1.55 micron eye-safe laser-generated SWIR and such efficiency occurs at approximately 1.7 microns.

While FIG. 9 illustrates CMOS image sensor 902 and NNV light image sensor 904 as distinct components, in some embodiments, CMOS image sensor 902 and NNV light image sensor 904 can be a single component. For example, a single sensor (e.g., CCD image sensor) can replace CMOS image sensor 902 and NNV light image sensor 904. In some embodiments, for example, the CCD image sensor can be able to detect light from approximately 350 nm to about 700 nm.

Signal processing component 906 can include structure, hardware, software and/or functionality to perform any number of different types of processing on visible light information and/or NNV light information received by and/or accessed by digital camera 102. In one embodiment, signal processing component 906 can be software performing one or more of the functions described herein.

In some embodiments, signal processing component 906 can receive light information detected by one or more sensors of VNP 604 and generate a color representation of the visible light information, the NNV light information and/or a combination image composed of visible light information and NNV light information.

For example, signal processing component 906 can apply a first color scheme to the visible light information and can apply a second color scheme to the NNV light information. In one embodiment, the visible light information can be represented by a monochromatic color scheme or a grayscale color scheme, and the NNV light information can be represented by a color that differs from the color associated with the monochromatic color scheme or the grayscale color scheme for ease of viewing the NNV light information on the display component of digital camera.

Signal processing component 906 can also combine the electronic image representations of visible light information and NNV light information. For example, signal processing component 906 can overlap, or overlay, the NNV light information and the visible light information on one another such that NNV light information can be located at a position corresponding to the position in the scene captured by digital camera 102.

In some embodiments, in which one or more sensors of VNP component 604 output combined visible light information and NNV light information, signal processing component 906 can process the combined information twice. First, signal processing component 906 can process the combined information in a manner optimal for retrieving visible light information. Then, signal processing component 906 can process the combined information in a manner optimal for retrieving NNV light information. With regard to retrieval of NNV light information, signal processing component 906 can process the combined information to identify frequency spikes at locations corresponding to NNV spectrum light. Accordingly, in various embodiments, the sensed visible light and the sensed NNV light can be processed by signal processing component 906 to display visible and NNV light information.

In various embodiments, signal processing component 906 can perform mapping, gamma correction, pixel correction, noise reduction, interpolation and any number of other functions typically associated with image processing.

Figure 11:
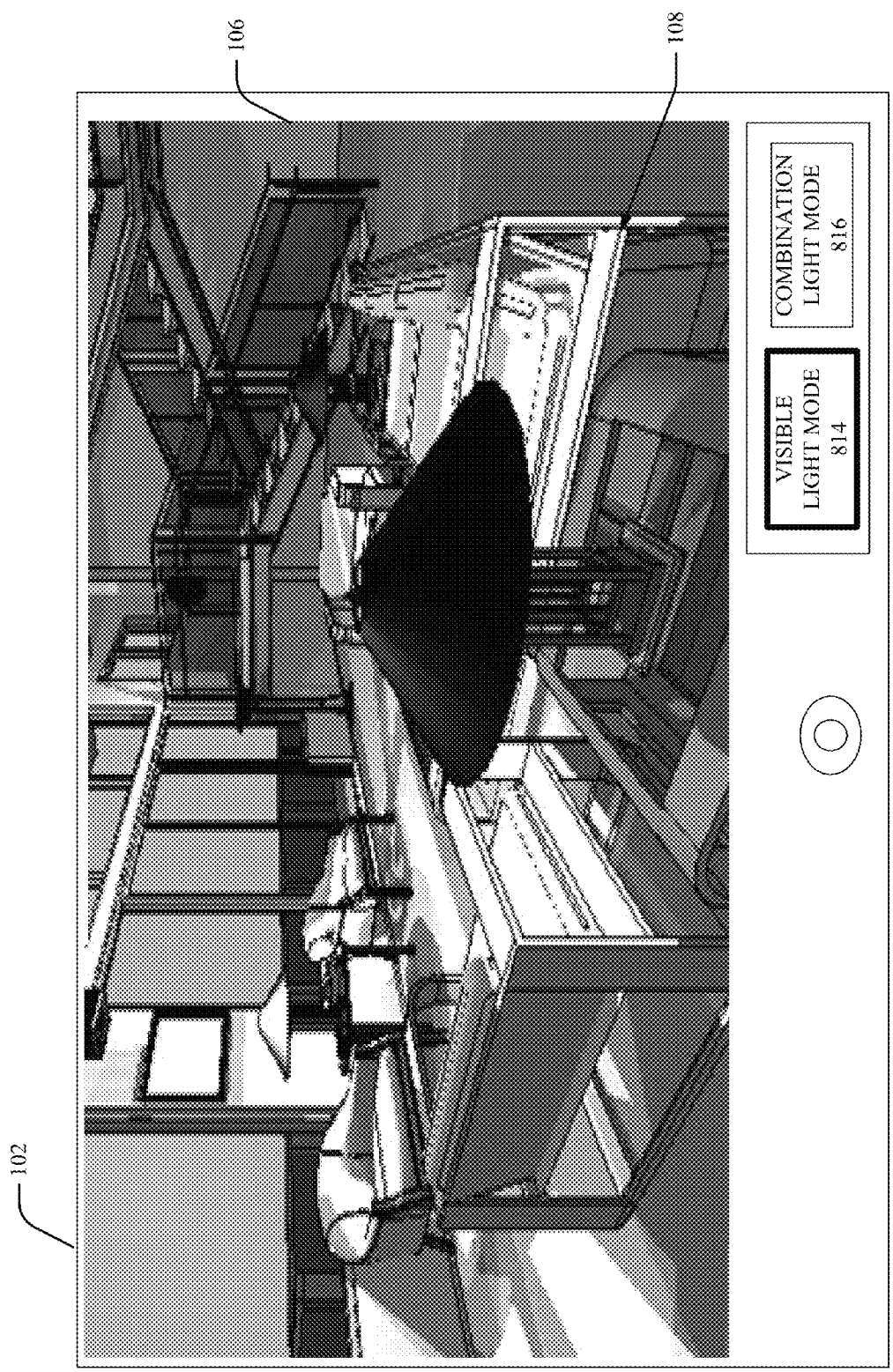
FIG. 11 illustrates an example digital camera display region displaying an image generated from processing and displaying visible light information in accordance with embodiments described herein.
Figure 12:
FIG. 12 illustrates an example digital camera display region displaying an image generated from processing and displaying visible light information and NNV light information in accordance with embodiments described herein.

FIG. 11 illustrates an example digital camera display region displaying an image generated from processing and displaying visible light information in accordance with embodiments described herein. FIG. 12 illustrates an example digital camera display region displaying an image generated from processing and displaying visible light information and NNV light information in accordance with embodiments described herein. Digital camera 102 can include display region 106 configured to display visible light information 108 when visible light mode 814 is selected for digital camera 102. Digital camera 102 can include display region 106 configured to process and display visible light information 108 and NNV light information 110 when combination light mode 816 is selected. As shown, additional information can be provided on the lampshade to detail information about the lampshade.

Similarly, although not shown, in some embodiments, a schematic drawing can be provided on a wall or other surface via nano material that reflects NNV light. The schematic drawing can be displayed using digital camera 102 in various embodiments and can be useful for determining locations of various electrical circuitry in walls of residential and commercial buildings.

FIG. 13 illustrates an example digital camera display region displaying an image generated from processing and displaying visible light information in accordance with embodiments described herein. FIG. 14 illustrates an example digital camera display region displaying an image generated from processing and displaying visible light information and NNV light information in accordance with embodiments described herein. Digital camera 102 can include display region 106 configured to display visible light image representation 108 when visible light mode 814 is selected for digital camera 102. Digital camera 102 can include display region 106 configured to process and display visible light information 108 and NNV light information 110 when combination light mode 816 is selected.

Although not considered a traditional mobile device in the sense of mobile device 500 described with reference to FIG. 5, in various embodiments, vehicles (e.g., autonomous vehicles, traditional non-autonomous vehicles) can be considered mobile devices having functionality and/or structure for processing and display of combination light in accordance with one or more embodiments described herein.

Figure 15:
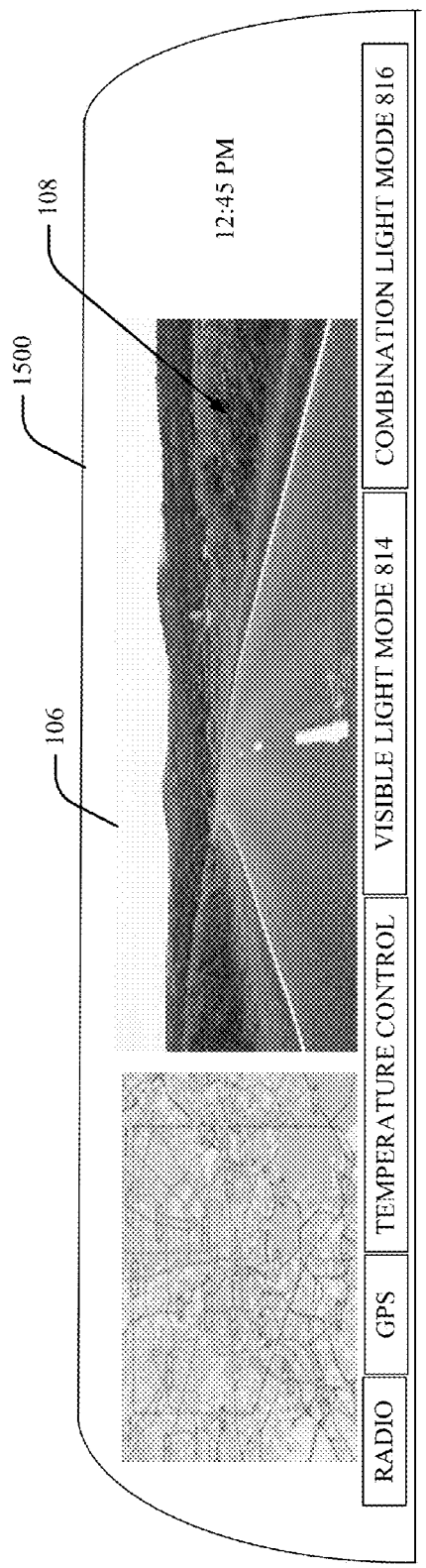
FIG. 15 illustrates an example automobile dashboard display region displaying an image generated from processing and displaying visible light information in accordance with embodiments described herein.
Figure 16:
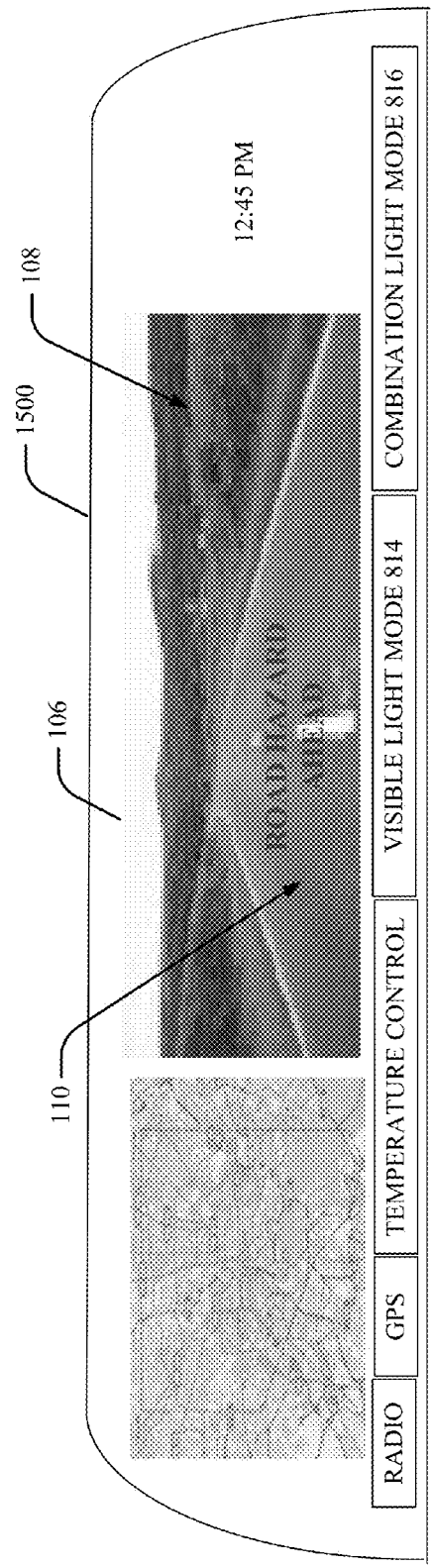
FIG. 16 illustrates an example automobile dashboard display region displaying an image generated from processing and displaying visible light information and NNV light information in accordance with embodiments described herein.

FIG. 15 illustrates an example automobile dashboard display region displaying an image generated from processing and displaying visible light information in accordance with embodiments described herein. FIG. 16 illustrates an example automobile dashboard display region displaying an image generated from processing and displaying visible light information and NNV light information in accordance with embodiments described herein.

In some embodiments, an automobile dashboard is a part of a vehicle configured to retrieve NNV information on roadways or signs associated with roadways. The vehicles can be configured to obtain information from M2M sensors in some embodiments. The NNV light information 110 retrieved by the vehicle can be displayed on display region 106 in some embodiments. Accordingly, various road conditions can be communicated to drivers in advance of the vehicle arriving at the road condition. In the embodiment shown, NNV light information 110 noting a road hazard further down the roadway is displayed on display region 106.

Display apparatus 1500 can include display region 106 configured to display visible light information 108 in visible light image mode. Display apparatus 1500 can include display region 106 configured to display combination light information including visible light information 108 and NNV light information 110 in combination light image mode.

Accordingly, in the field of autonomous vehicles, digital cameras on the vehicles can view visible light information and/or NNV light information on roadways or signs or any other location outside of the vehicle. Special pavement markers, for example, can provide instructions to certain autonomous vehicles and/or smart sensors in the digital camera can turn the vehicle on based on information captured from outside of the vehicle. In other embodiments, trucks with structured graphics sprayers can spray nano material that can temporarily provide advertising or other information and can degrade over one or more different lengths of time based on the type of nano material employed in the sprayer.

Figure 18:
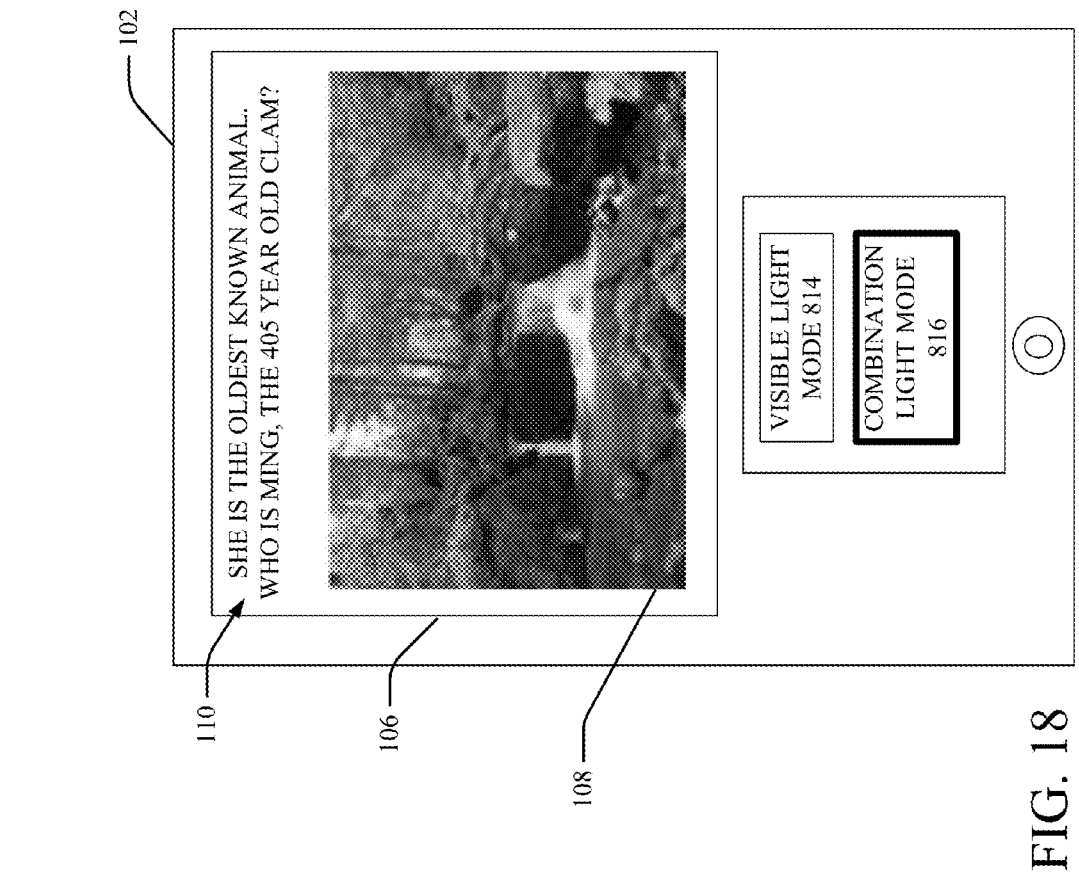
FIG. 18 illustrates an example block diagram of a digital camera display region displaying a combination image composed of visible light and NNV light captured from the object of FIG. 17 in accordance with embodiments described herein.
Figure 17:
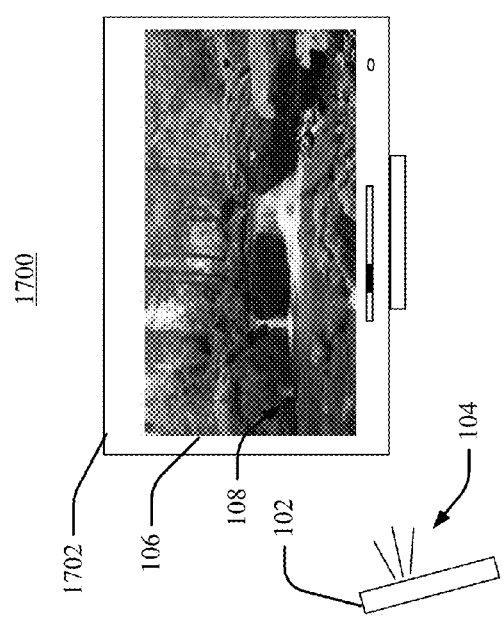
FIG. 17 illustrates an example block diagram of a system including a digital camera configured to process and display combination visible and NNV light, and an object emitting radiation in the NNV spectrum in accordance with embodiments described herein.

FIG. 17 illustrates an example block diagram of a system including a digital camera configured to process and display combination visible and NNV light, and an object emitting radiation in the NNV spectrum in accordance with embodiments described herein. FIG. 18 illustrates an example block diagram of a digital camera display region displaying a combination image composed of visible light and NNV light captured from the object of FIG. 17 in accordance with embodiments described herein.

System 1700 includes digital camera 102 configured to emit light 104 and television 1702. Television 1702 includes display region 106 configured to concurrently display visible light information and NNV light information. For example, in one embodiment, light emitting diodes (LEDs) in television 1702 can emit NNV light and television 1702 can also emit visible light (e.g., programming viewable with the human, naked eye).

Display region 106 can display combination image including visible light information 108 and NNV light information 110. As shown, combination light mode 816 is selected and digital camera 102 therefore processes and displays combination visible and NNV light. As shown on FIG. 18, on display 106, NNV and visible image representation information is provided. However, on FIG. 17, the NNV information is not visible to the human eye and is only visible via the processing and display of digital camera 102.

As such, the example illustrates the ability to allow different persons to view two different programs concurrently. Layers of different types of information can be displayed on an LDC and/or plasma television to enable viewing of multiple different broadcasts with different content.

The program represented in NNV image representation can be viewed through display 106 of digital camera 102 while visible image representation programming can be viewed with the naked human eye. As shown, one program displays a waterfall and the other program is a trivia show displaying textual questions and corresponding answers. Another example is the concurrent display of sports programming as visible light information and statistical data as NNV light information. Any number of different types of programs can be concurrently viewed in system 1700.

Accordingly, if digital camera 102 is directed towards television 1702, NNV light from the emitters in television 1702 can be captured by digital camera 102 and displayed on display region 106. In one example, both visible light information 108 and NNV light information 110 can be displayed on display region 106. As such, digital camera 102 can enable viewing of concurrently displayed programming having visible light and NNV light. Two different television shows can be concurrently viewed on a single screen of television 1702.

Figure 19:
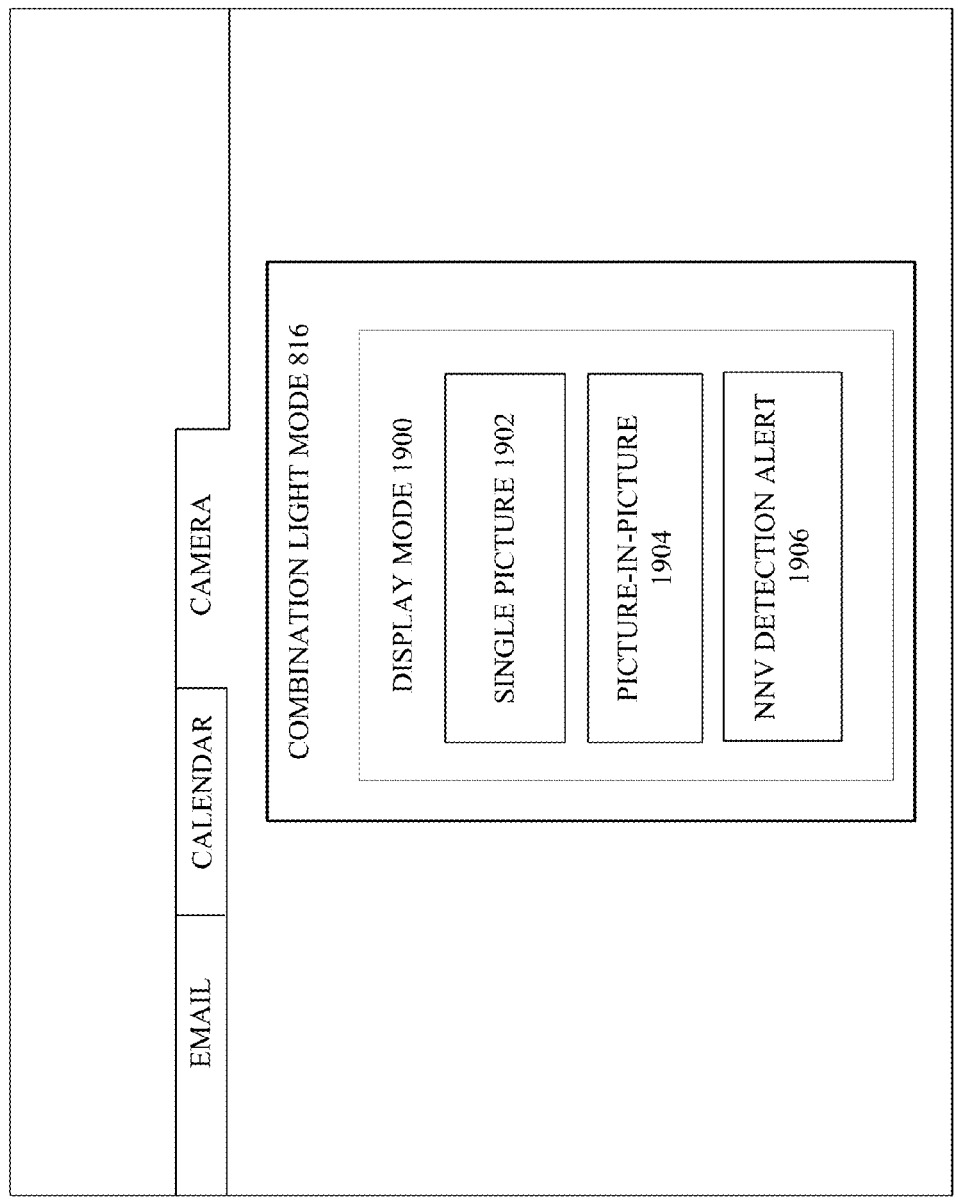
FIG. 19 illustrates an example block diagram of a digital camera display region illustrating settings to configure the digital camera to concurrently display a combination image from visible light information and NNV light information, and an image from visible light information as picture-in-picture or to configure the digital camera to provide an NNV detection alert in accordance with embodiments described herein.
Figure 20:
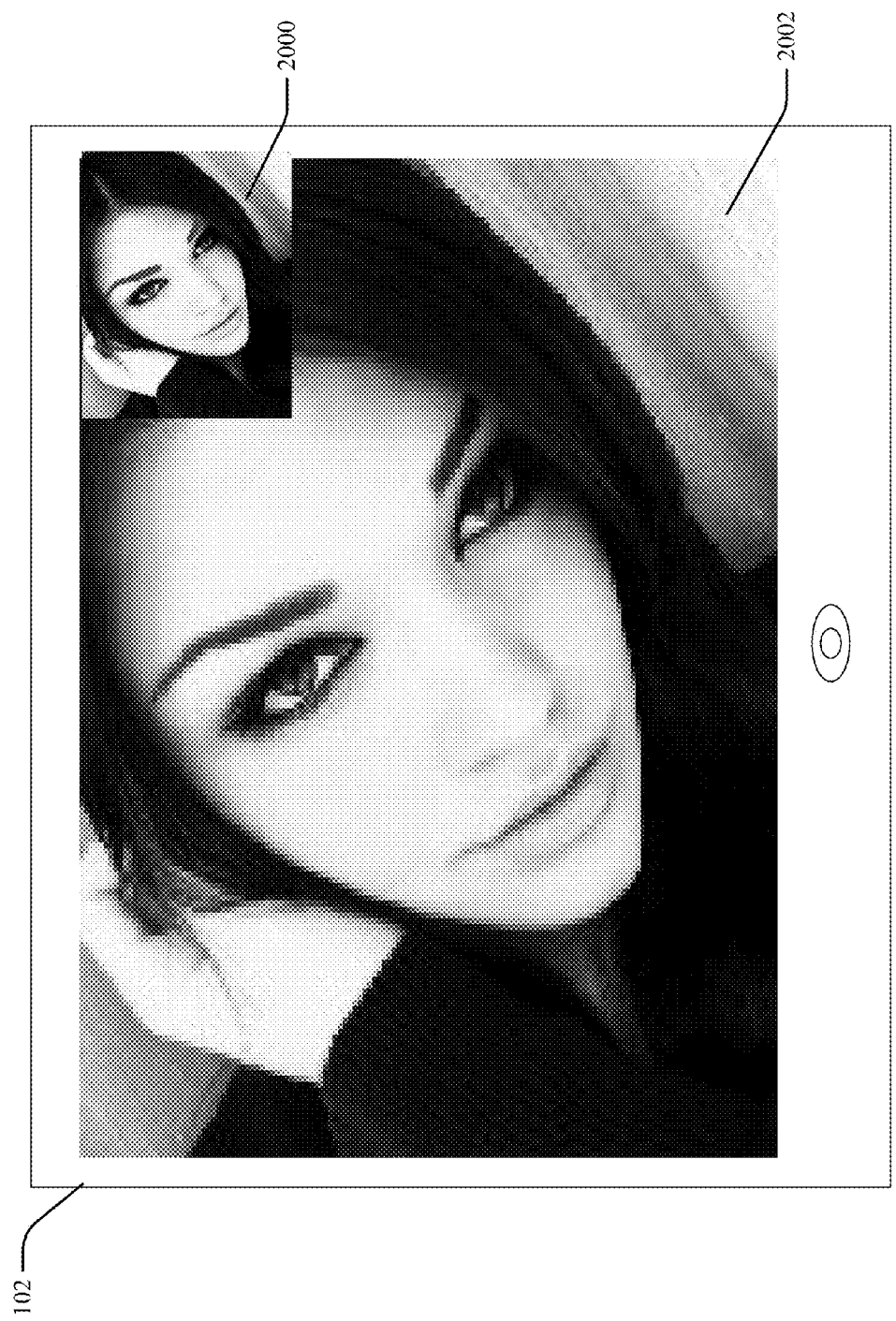
FIG. 20 illustrates an example block diagram of a digital camera display region concurrently displaying a combination image from visible light information and NNV light information, and an image from visible light information as picture-in-picture in accordance with embodiments described herein.

FIG. 19 illustrates an example block diagram of a digital camera display region illustrating settings to configure the digital camera to concurrently display a single combination image (e.g., single picture 1902), a combination image including visible light information and NNV light information, and an image including visible light information as picture-in-picture (e.g., picture-in-picture 1904) or to configure the digital camera to provide an NNV detection alert (e.g., NNV detection alert 1906). FIG. 20 illustrates an example block diagram of a digital camera display region concurrently displaying a combination image including visible light information and NNV light information, and an image including visible light information as picture-in-picture in accordance with embodiments described herein.

As shown in FIG. 19, an example screenshot of a display component (e.g., display component 606) when configuration component 602 of FIG. 6 is accessed or activated can include information for controlling the following different types of settings for the display mode of digital camera 102: single picture 1902, picture-in-picture 1904 and NNV detection alert 1906. The setting for single picture 1902 display can cause digital camera 102 to display a combination image from processing visible light and NNV light such as that shown in FIG. 12, 14 or 16.

The setting for picture-in-picture 1904 display can cause digital camera 102 to provide a concurrent display of a combination image from visible light information and NNV light information, and an image constructed from only visible light information ("visible light image") via the display region of digital camera 102. With reference to FIGS. 19 and 20, in this embodiment, combination image 2000 can be displayed overlapping a portion of the display of visible light image 2002. For example, combination image 2000 can be inset in a corner of visible light image 2002. In other embodiments (not shown), visible light image 2002 can be displayed overlapping a portion of combination image 2000. In still other embodiments, one portion of a display region can display combination image 2000 and a second portion of the display region can display visible light image 2002 such that neither image is overlapping (e.g., one half of the display region displays combination image 2000 and a second half of the display region displays visible light image 2002). The embodiments described can display combination image 2000 and visible light image 2002 concurrently or simultaneously as desired by the user and/or as specified via the design of digital camera 102.

While the picture-in-picture display is described in the above embodiment as being provided when the combination light mode 816 is activated, in other embodiments, the picture-in-picture display capability need not be limited to instances in which combination light mode 816 is activated. For example, in some embodiments, picture-in-picture capability can be provided by digital camera 102 based on digital camera 102 being powered on.

Figure 21:
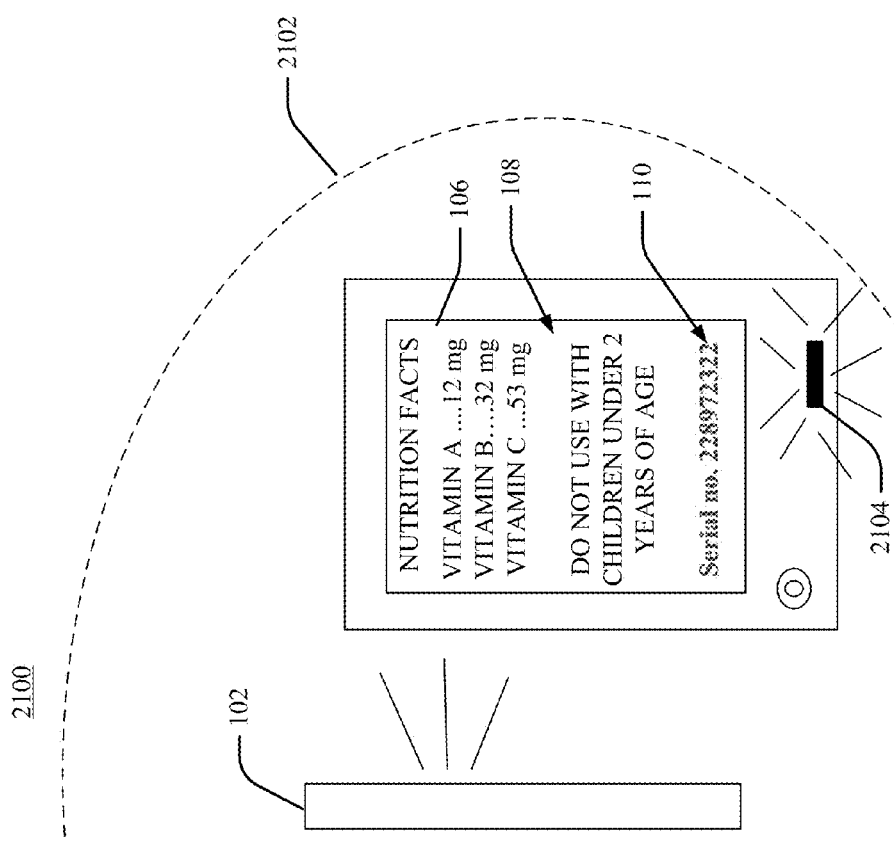
FIG. 21 illustrates an example block diagram of a digital camera including an icon configured to provide an alert of detected NNV light in accordance with embodiments described herein.

Referring back to FIG. 19, the setting for NNV detection alert 1906 can cause digital camera 102 to provide a visual or audio alert upon detection of NNV light in accordance with embodiments described herein. FIG. 21 illustrates an example block diagram of a digital camera including an icon configured to provide an alert of detected NNV light in accordance with embodiments described herein.

Referring to FIGS. 19 and 21, digital camera 102 can detect NNV light information 110 being output within detection region 2102 of digital camera 102. Digital camera 102 can generate an alert of detected NNV light information 110. The alert can be a visual alert, an audio alert or a combination of visual and audio alerts in various different embodiments.

In some embodiments, the alert can include illumination of icon 2104 or modification of the appearance of icon 2104 when NNV light information 110 is detected within detection region 2102. For example, when NNV light information 110 is not detected within detection region 2102 of digital camera 102, icon 2104 can be non-illuminated or static or have a first image (e.g., icon image 1). In response to detection of NNV light information 110, icon 2104 can become illuminated (as shown in FIG. 21), exhibit motion or have a second image (e.g., icon image 2). As an example of a change in image, icon image 1 can be a first word ("VISIBLE ONLY") and icon image 2 can be a second word (e.g., "COMBINATION"). As another example, icon image 1 can be a tree and icon image 2 can be a forest. Any number of different icons can be employed and, in some embodiments, user-selected.

In various other embodiments, the alert can be an audio alert that can be activated to emit sound when NNV light information is detected within detection region 2102. For example, when NNV light information 110 is not detected within detection region 2102 of digital camera 102, digital camera 102 can be silent. In response to detection of NNV light information 110 within detection region 2102, digital camera 102 can emit sound (e.g., beep, ring, ringtone).

While the embodiments describe with reference to FIG. 21, include detection of NNV light information, in various embodiments, detection of combination visible light information and NNV light information can also be performed.

In some embodiments, digital camera 102 can include software configured to execute as a background process to perform constant, or at least intermittent, monitoring for the presence of NNV light information 110 in detection region 2102 of digital camera 102.

Figure 22:
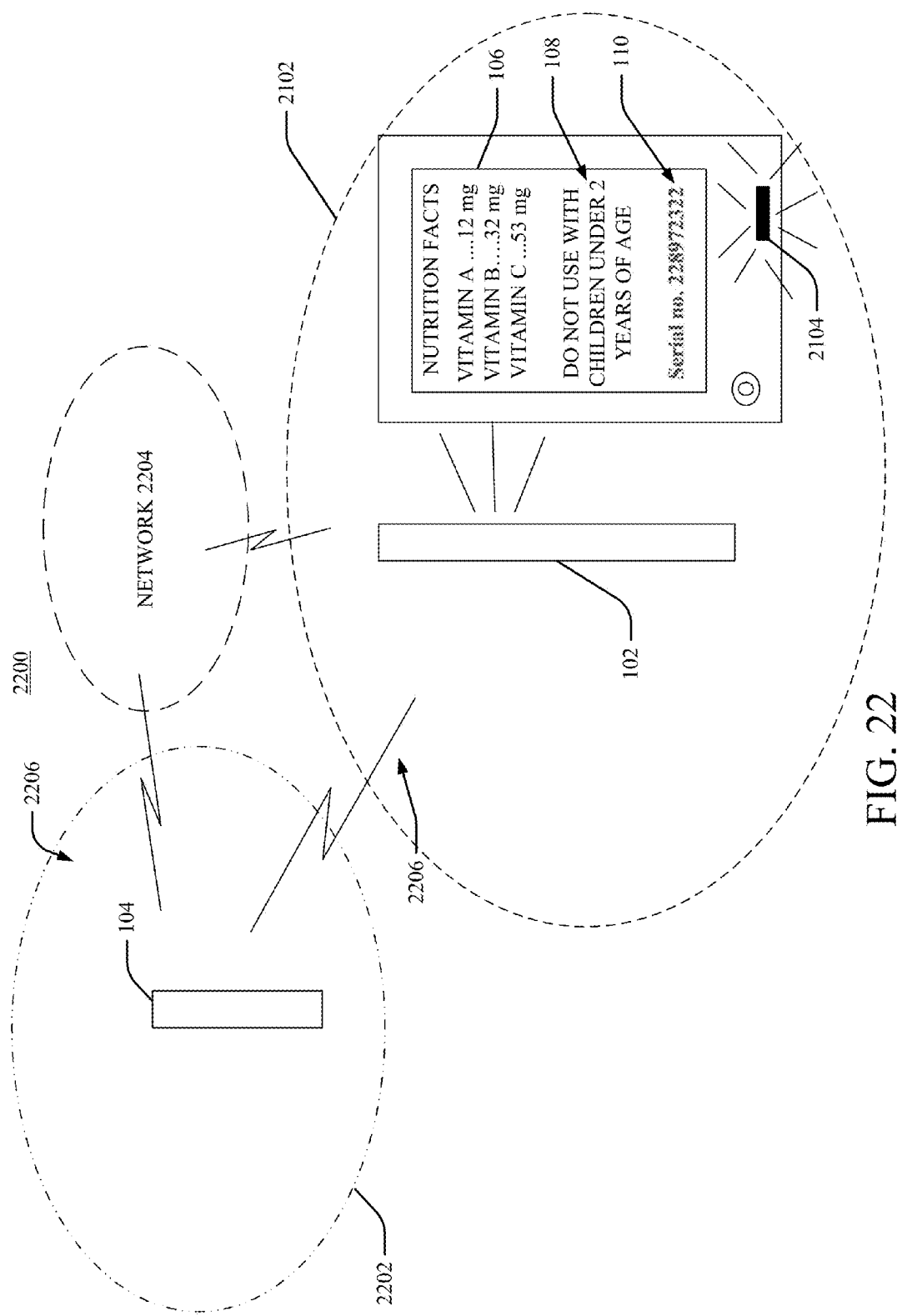
FIG. 22 illustrates an example block diagram of a system including digital cameras configured to detect, process and/ or display combination images from visible light information and NNV light information in accordance with embodiments described herein.

FIG. 22 illustrates an example block diagram of a system including digital cameras configured to detect, process and/or display combination images including visible light information and NNV light information in accordance with embodiments described herein. System 2200 can include digital cameras 102, 104 having detection ranges 2102 and 2202, respectively, and network 2204 communicatively coupled to digital cameras 102, 104. In various embodiments, network 2204 can include one or more channels over which digital cameras 102, 104 can communicate with one another. In some embodiments, digital cameras 102, 104 can communicate with one another via near field communication channel 2206 established between digital cameras 102, 104 after digital cameras 102, 104 are in close geographic proximity to one another and discovery is performed according to a near field communication protocol. As such, in some embodiments, digital cameras 102, 104 can communicate with each other via a near field communication channel and in some embodiments, digital cameras 102, 104 can communicate with one another via any number of other different types of channels of network 2204 including, but not limited to, channels associated with Wi-Fi networks, WLAN networks, etc.

In various embodiments, digital camera 104 can include any of the structure and/or functionality of digital camera 102 with reference to any of the embodiments and/or figures described or illustrated herein. For example, while digital camera 104 is described as receiving a signal transmitted from digital camera 102, in other embodiments, digital camera 102 can receive a signal transmitted from digital camera 104. Digital cameras 102, 104 have structure and/or functionality for facilitating detection, processing and/or display of visible light information 108 and NNV light information 110. Digital cameras 102, 104 can also include structure and/or functionality to provide alerts of detected visible light information 108 and/or NNV light information 110.

In the embodiment shown, digital camera 102 can detect NNV light information 110 in detection region 2102 of digital camera 102 and transmit signal 2206 to digital camera 104 after the detection. Digital camera 104 can have detection region 2202 and thus not detect visible light information 108 and/or NNV light information 110 since the object (not shown) having visible light information 108 and NNV light information 110 is provided in detection region 2102.

In various embodiments, signal 2206 can receive include information indicative of a message informing digital camera 104 of the detection of NNV light information 110. Signal 2206 can also include information indicative of the geographic location of digital camera 102, information indicative of an approximate geographic location of visible light information 108 and NNV light information 110, and/or information indicative of the geographic boundaries of detection region 2102 of digital camera 102.

In some embodiments, the information can also include information indicative of directions from a geographic location of digital camera 104 to digital camera 102. In these embodiments, digital camera 102 and/or digital camera 104 can include software and/or hardware configured to interact with or determine location information, including, but not limited to, global positioning system (GPS) information. In some embodiments, digital cameras 102, 104 can be communicatively coupled to or able to access or receive information from a device or service providing location-based services. For example, the device or service providing location-based services can be communicatively coupled to network 2204.

Figure 23:
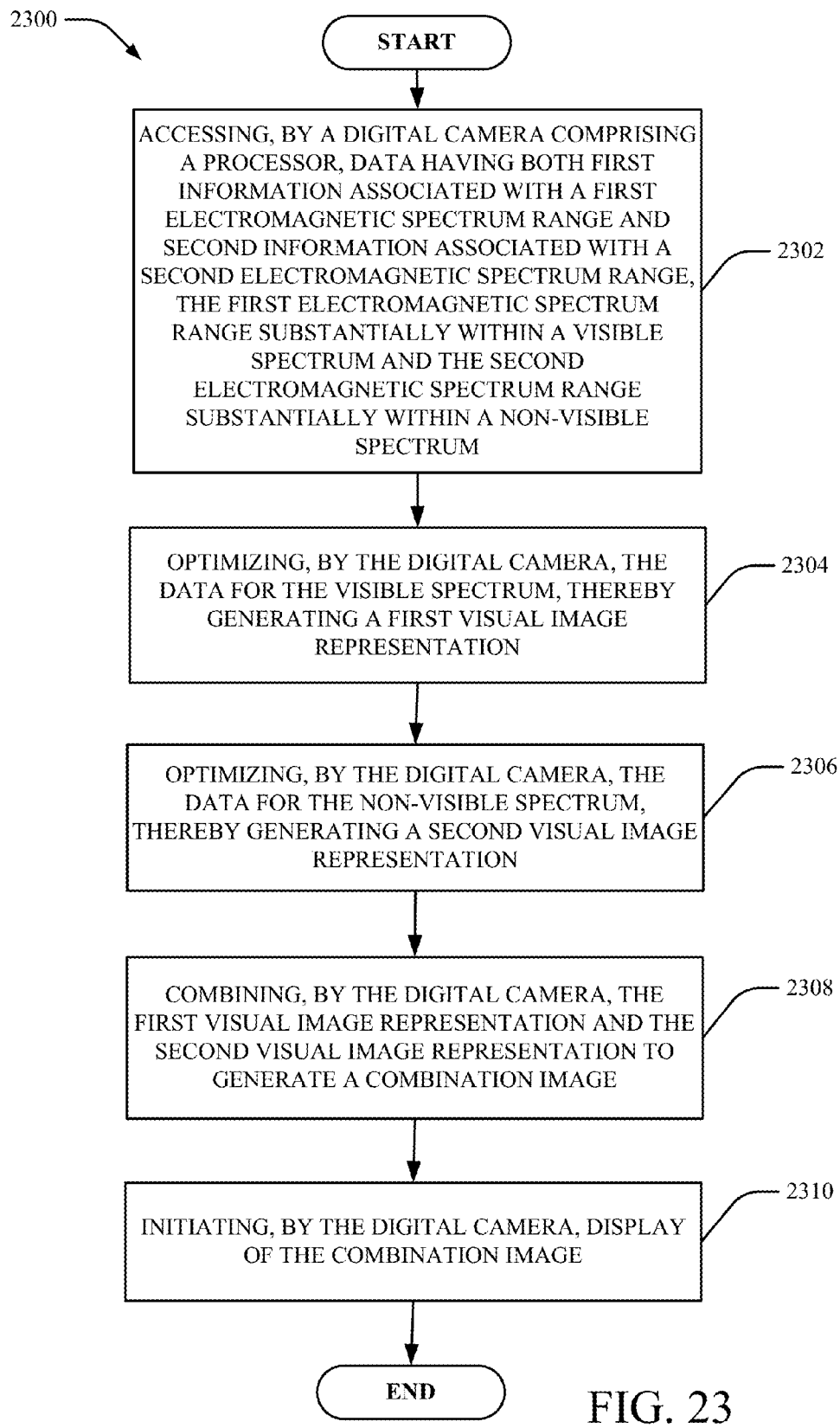

FIGS. 23, 24, 25, 26 and 27 illustrate example flowcharts of methods that facilitate detection, processing and/or display of a combination image composed of visible and NNV light information in accordance with embodiments described herein. Turning first to FIG. 23, at 2302, method 2300 can include accessing, by a digital camera comprising a processor, raw data having both first information associated with a first electromagnetic spectrum range and second information associated with a second electromagnetic spectrum range. The first electromagnetic spectrum range can be substantially within a visible spectrum and the second electromagnetic spectrum range can be substantially within an NNV spectrum.

In some embodiments, the first electromagnetic spectrum range can include a range between approximately 390 nm and approximately 700 nm. The second electromagnetic spectrum range can include a range of wavelengths less than approximately 390 nanometers. In some embodiments, the second electromagnetic spectrum range can include a range of wavelengths greater than approximately 700 nanometers.

The first visual image representation can be a monochromatic image representation in some embodiments. The second visual image representation can be a color corresponding to a wavelength of the first electromagnetic spectrum range in some embodiments. For example, the second visual image representation can be the color red, blue, purple, green or orange (or a combination thereof).

At 2302, method 2300 can include optimizing, by the digital camera, the raw data for the visible spectrum, thereby generating a first visual image representation. At 2304, method 2300 can include optimizing, by the digital camera, the raw data for the NNV spectrum, thereby generating a second visual image representation. For example, optimizing the raw data for the NNV spectrum can be performed in response to detection of a selection of a mode of the digital camera. The mode can be associated with display of the combination image.

At 2306, method 2300 can include combining, by the digital camera, the first visual image representation and the second visual image representation to generate a combination image. For example, in some embodiments, the monochromatic image can be overlaid over a color corresponding to a wavelength in the first electromagnetic spectrum range. At 2308, method 2300 can include initiating, by the digital camera, display of the combination image.

Figure 24:
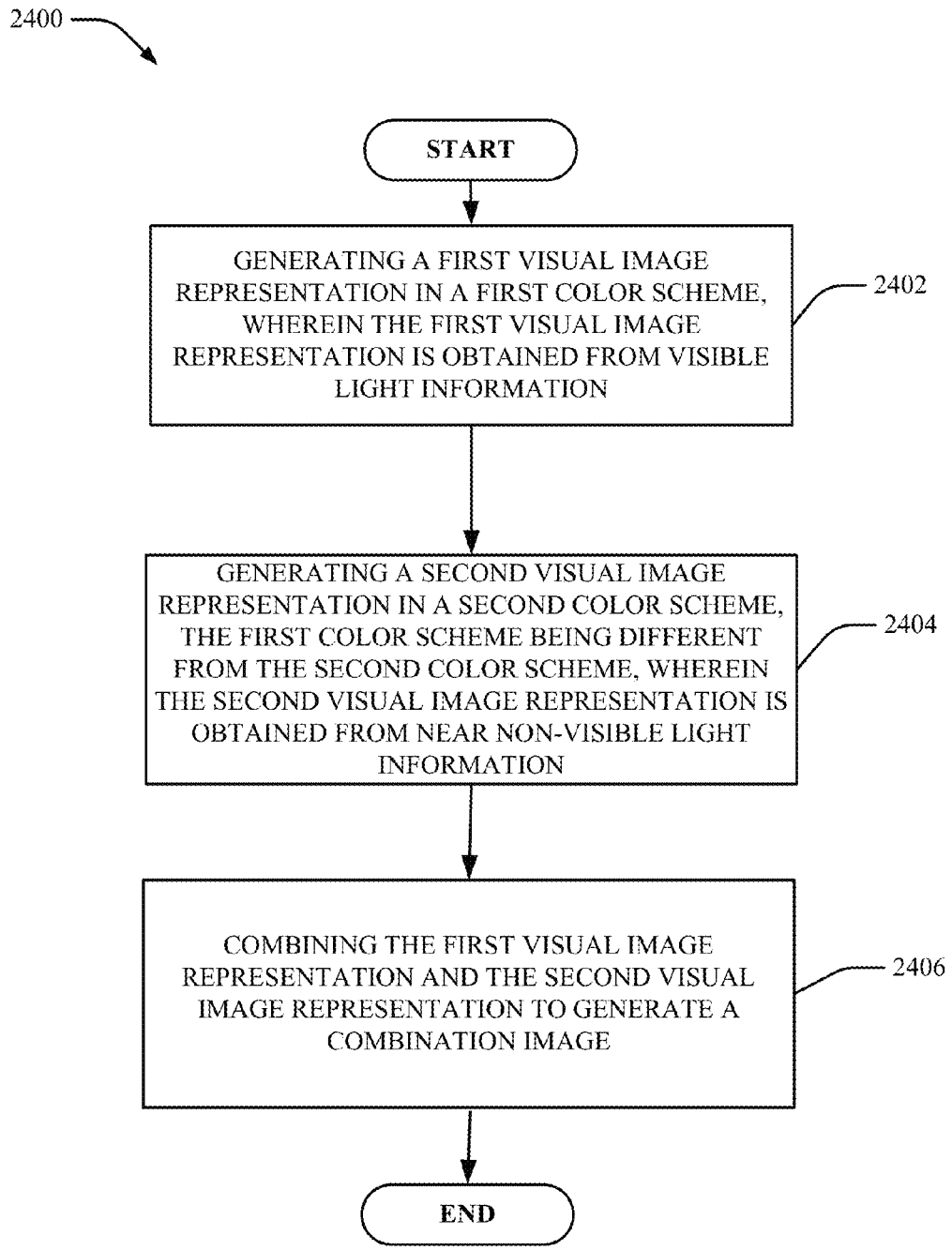

Turning now to FIG. 24, at 2402, method 2400 can include generating a first visual image representation in a first color scheme. In some embodiments, the first visual image representation is obtained from visible light information.

At 2404, method 2400 can include generating a second visual image representation in a second color scheme that is different from the first color scheme. For example, the first color scheme can be a monochromatic color scheme and the second color scheme can be composed of a color scheme different from a monochromatic color scheme. In some embodiments, the second color scheme can include one or more colors different from the colors from which the monochromatic color scheme is composed. In some embodiments, the first visual image representation is obtained from NNV light information.

At 2406, method 2400 can include combining the first visual image representation and the second visual image representation to generate a combination image. For example, the first visual image representation and the second visual image representation can be overlaid one over another or interleaved together to form the combination image.

Figure 25:
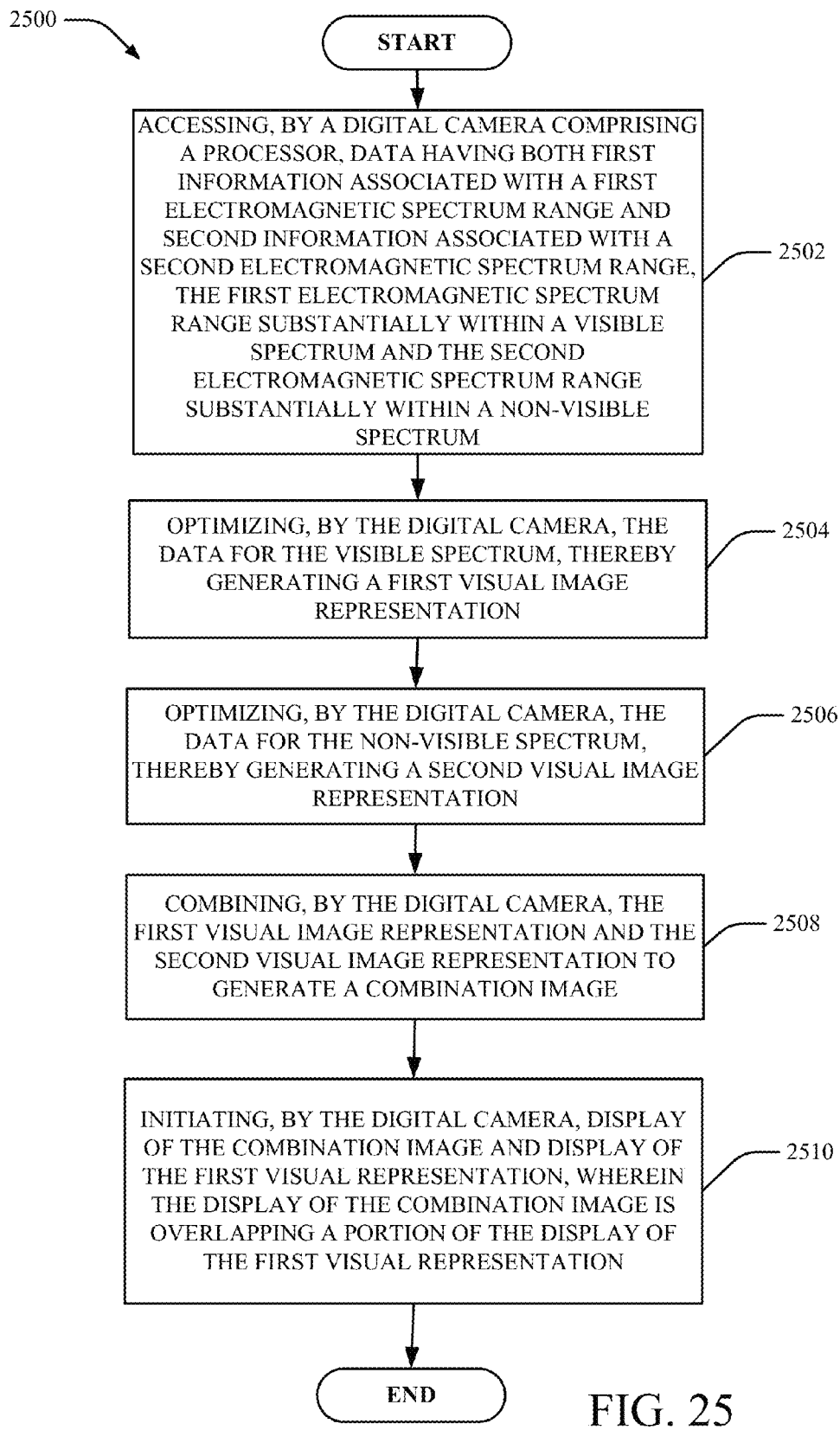

Turning now to FIG. 25, at 2502, method 2500 can include accessing, by a digital camera comprising a processor, raw data having both first information associated with a first electromagnetic spectrum range and second information associated with a second electromagnetic spectrum range. The first electromagnetic spectrum range can be substantially within a visible spectrum and the second electromagnetic spectrum range can be substantially within an NNV spectrum.

In some embodiments, the first electromagnetic spectrum range can include a range between approximately 390 nm and approximately 700 nm. The second electromagnetic spectrum range can include a range of wavelengths less than approximately 390 nanometers. In some embodiments, the second electromagnetic spectrum range can include a range of wavelengths greater than approximately 700 nanometers.

The first visual image representation can be a monochromatic image representation in some embodiments. The second visual image representation can be a color corresponding to a wavelength of the first electromagnetic spectrum range in some embodiments. For example, the second visual image representation can be the color red, blue, purple, green or orange (or a combination thereof).

At 2502, method 2500 can include optimizing, by the digital camera, the raw data for the visible spectrum, thereby generating a first visual image representation. At 2504, method 2500 can include optimizing, by the digital camera, the raw data for the NNV spectrum, thereby generating a second visual image representation. For example, optimizing the raw data for the NNV spectrum can be performed in response to detection of a selection of a mode of the digital camera. The mode can be associated with display of the combination image.

At 2506, method 2500 can include combining, by the digital camera, the first visual image representation and the second visual image representation to generate a combination image. For example, in some embodiments, the monochromatic image can be overlaid over a color corresponding to a wavelength in the first electromagnetic spectrum range. At 2508, method 2500 can include initiating, by the digital camera, display of the combination image and display of the first visual image representation. In this embodiment, the combination image can be displayed overlapping a portion of the display of the first visual image representation. For example, the combination image can be inset in a corner of the first visual image representation. In other embodiments, the first visual image representation can be displayed overlapping a portion of the combination image. In still other embodiments, one portion of a display region can display the combination image and a second portion of the display region can display the first visual image representation such that neither image is overlapping (e.g., one half of the display region displays the combination image and a second half of the display region displays the first visual image representation). The embodiments described can display the combination image and first visual image representation concurrently or simultaneously as desired by the user and/or as specified in system or device or digital camera design.

Figure 26:
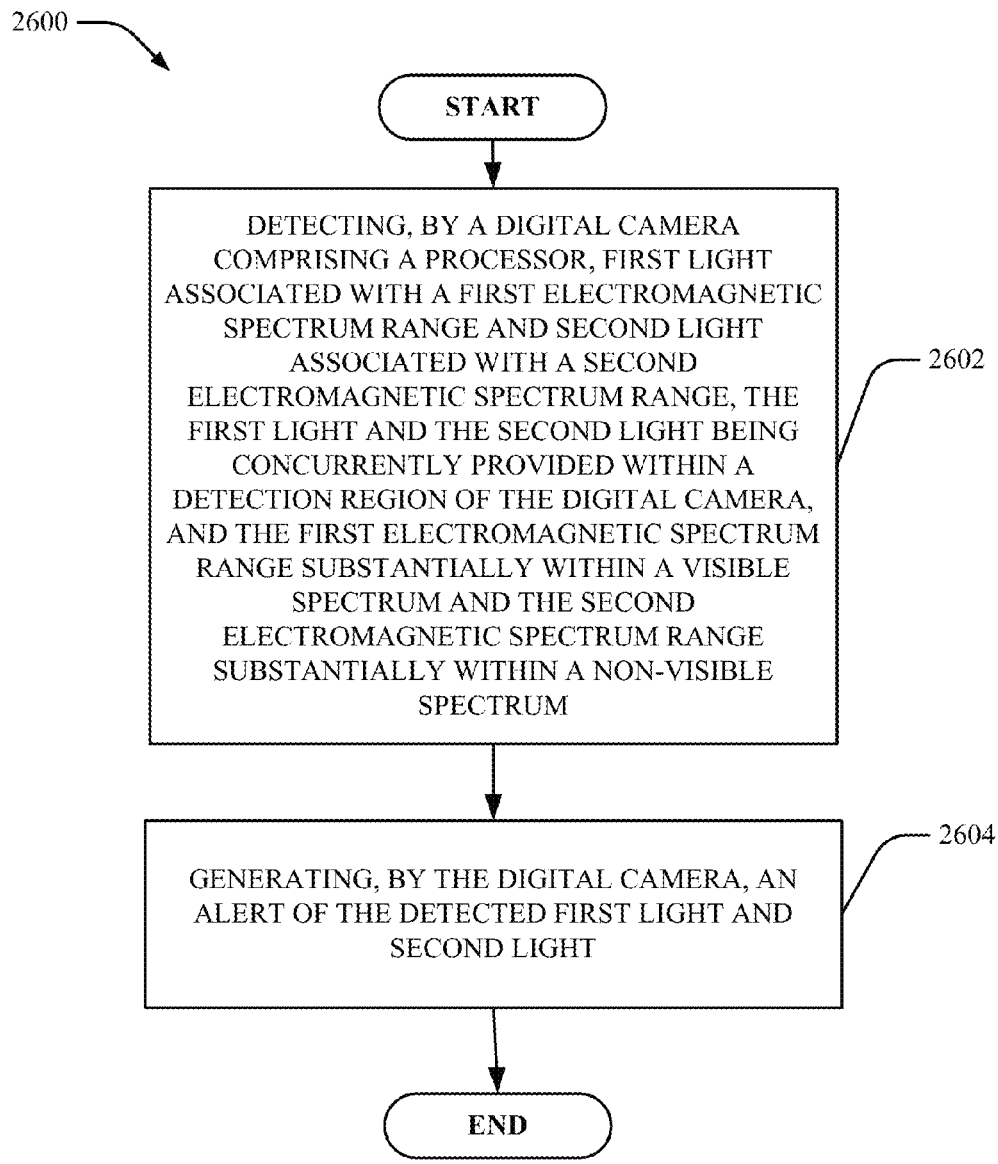

Turning now to FIG. 26, at 2602, method 2600 can include detecting, by a digital camera comprising a processor, first light associated with a first electromagnetic spectrum range and second light associated with a second electromagnetic spectrum range. In various embodiments, for example, the first electromagnetic spectrum range is substantially within a visible spectrum and the second electromagnetic spectrum range is substantially within a non-visible spectrum. Further, the detection can be detection of the first light and the second light being concurrently (or, in some embodiments, simultaneously) provided within a detection region of the digital camera. As such, the digital camera can detect the presence of first light and second light in the environment surrounding the digital camera.

In some embodiments, detection can be performed by image processing software that can execute as an ongoing background process in the digital camera. As such, in these embodiments, the digital camera can detect the presence of the first and second light without need for the digital camera to be placed in the combination mode. In some embodiments, minimal processing can be performed for detection and upon detection of the first and second light, additional processing can be performed to obtain and process the first and second light. In this embodiment, different levels of processing can be provided within the digital camera to preserve battery life and/or provide for optimal processing of one or more other functions of the digital camera.

At 2604, method 2600 can include generating, by the digital camera, an alert of the detected first light and second light. The alert can be a visual alert, an audio alert or a combination of visual and audio in various different embodiments.

In various embodiments, the alert can be an icon that can be illuminated or otherwise display a modified appearance when the first light and second light are detected as being concurrently provided. For example, when first light and second light are not detected as being concurrently provided within the detection region of the digital camera, the icon can have be non-illuminated or static. In response to detection of the first light and second light being concurrently provided, the icon can become illuminated or exhibit motion.

In various other embodiments, the alert can be an audio alert that can be activated to emit sound when the first light and second light are detected as being concurrently provided. For example, when first light and second light are not detected as being concurrently provided within the detection region of the digital camera, the alert can be silent. In response to detection of the first light and second light being concurrently provided, the icon can emit sound (e.g., beep, ring, ringtone).

Figure 27:
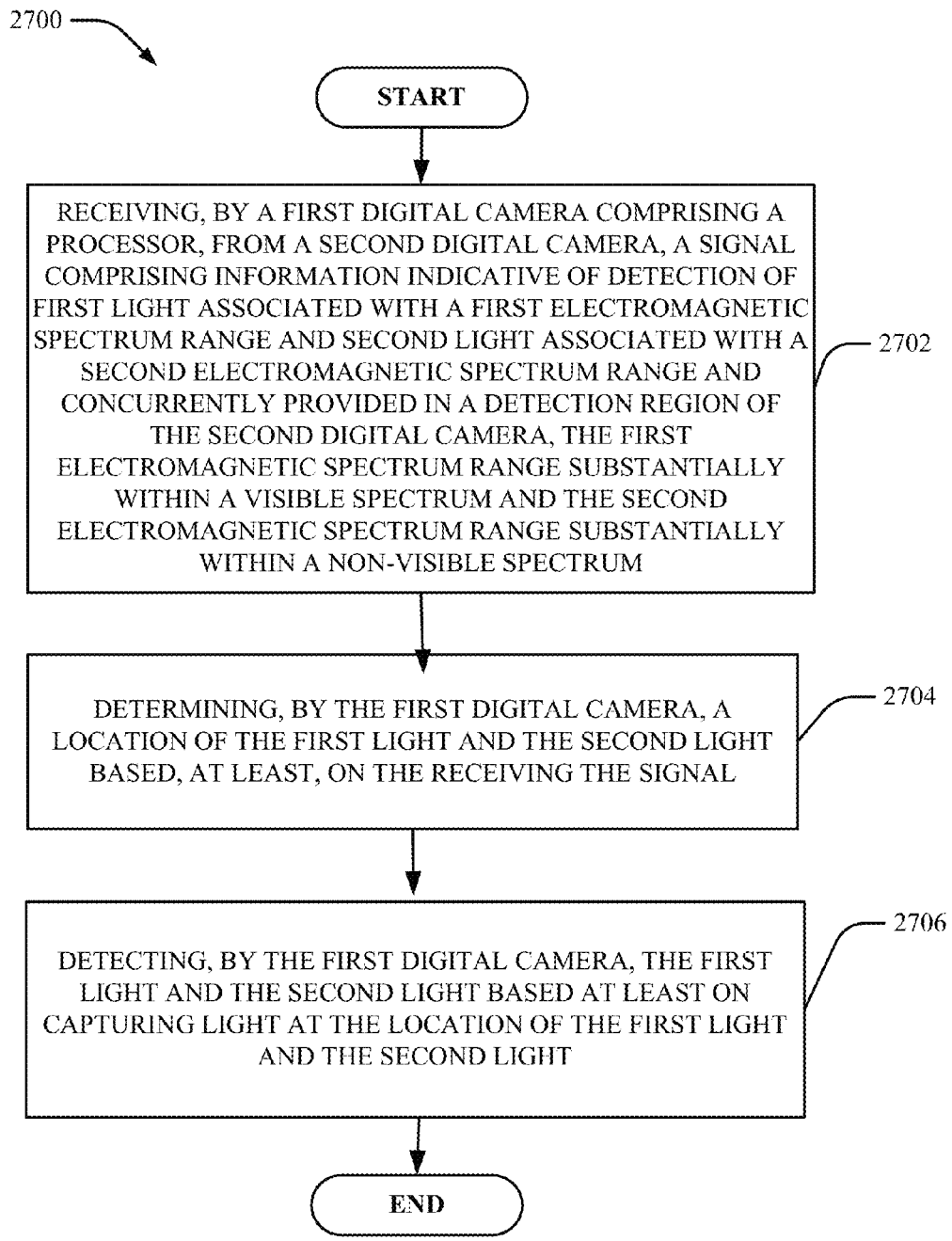

Turning now to FIG. 27, at 2702, method 2700 can include receiving, by a first digital camera comprising a processor, a signal comprising information indicative of detection of first light associated with a first electromagnetic spectrum range and second light associated with a second electromagnetic spectrum range and concurrently provided in a detection region of a second digital camera. For example, the first electromagnetic spectrum range can be substantially within a visible spectrum and the second electromagnetic spectrum range can be substantially within a non-visible spectrum.

In some embodiments, the signal can be received from a second digital camera that detected the presence of the first light and the second light. As such, the first light and the second light can be concurrently provided in a detection region of a second digital camera and the second digital camera can send the signal to the first detection camera notifying the first digital camera of the detected first and second light.

In some embodiments, the signal can include information indicative of the geographic location of the second digital camera, information indicative of an approximate geographic location of the detected first light and second light, and/or information indicative of the geographic boundaries of the detection region of the second digital camera. In some embodiments, the information can also include information indicative of directions from a geographic location of the first digital camera to the second digital camera. In these embodiments, the first digital camera and/or the second digital can include software and/or hardware configured to interact with or determine location information. In some embodiments, the first and/or second digital camera can be communicatively coupled to or able to access or receive information from a device or service providing location-based services.

At 2704, method 2700 can include determining, by the first digital camera, a location of the first light and the second light based, at least, on the receiving the signal. For example, the information received from the second digital camera can include location information and the first digital camera can be adapted to determine the location of the first light and second light. In other embodiments, the first digital camera can be adapted to determine the location of the second digital camera and/or the detection region of the second digital camera.

At 2706, method 2700 can include detecting, by the first digital camera, the first light and the second light based at least on capturing light at the location of the first light and the second light. For example, upon receipt of the signal, a user can locate the first digital camera in proximity to the location of the first light and second light and the first digital camera can then perform detection of the first light and second light.

FIG. 28 illustrates a block diagram of a computer operable to facilitate processing and display of combination visible and NNV light in accordance with embodiments described herein. For example, in some embodiments, the computer can be or be included within digital camera 102 and/or mobile device 500.

In order to provide additional context for various embodiments described herein, FIG. 28 and the following discussion are intended to provide a brief, general description of a suitable computing environment 2800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 28, the example environment 2800 for implementing various embodiments of the embodiments described herein includes a computer 2802, the computer 2802 including a processing unit 2804, a system memory 2806 and a system bus 2808. The system bus 2808 couples system components including, but not limited to, the system memory 2806 to the processing unit 2804. The processing unit 2804 can be any of various commercially available processors. Dual microprocessors and other multi-processor architectures can also be employed as the processing unit 2804.

The system bus 2808 can be any of several types of bus structure that can further interconnect to a memory bus (with or without a memory controller), a peripheral bus, and a local bus using any of a variety of commercially available bus architectures. The system memory 2806 includes ROM 2810 and RAM 2812. A basic input/output system (BIOS) can be stored in a non-volatile memory such as ROM, erasable programmable read only memory (EPROM), EEPROM, which BIOS contains the basic routines that help to transfer information between elements within the computer 2802, such as during startup. The RAM 2812 can also include a high-speed RAM such as static RAM for caching data.

The computer 2802 further includes an internal hard disk drive (HDD) 2814 (e.g., EIDE, SATA), which internal hard disk drive 2814 can also be configured for external use in a suitable chassis (not shown), a magnetic floppy disk drive (FDD) 2816, (e.g., to read from or write to a removable diskette 2818) and an optical disk drive 2820, (e.g., reading a CD-ROM disk 2822 or, to read from or write to other high capacity optical media such as the DVD). The hard disk drive 2814, magnetic disk drive 2816 and optical disk drive 2820 can be connected to the system bus 2808 by a hard disk drive interface 2824, a magnetic disk drive interface 2826 and an optical drive interface 2828, respectively. The interface 2824 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2802, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 2812, including an operating system 2830, one or more application programs 2832, other program modules 2834 and program data 2836. All or portions of the operating system, applications, modules, and/or data can also be cached in the RAM 2812. The systems and methods described herein can be implemented utilizing various commercially available operating systems or combinations of operating systems.

A mobile device can enter commands and information into the computer 2802 through one or more wired/wireless input devices, e.g., a keyboard 2838 and a pointing device, such as a mouse 2840. Other input devices (not shown) can include a microphone, an infrared (IR) remote control, a joystick, a game pad, a stylus pen, touch screen or the like. These and other input devices are often connected to the processing unit 2804 through an input device interface 2842 that can be coupled to the system bus 2808, but can be connected by other interfaces, such as a parallel port, an IEEE 1394 serial port, a game port, a universal serial bus (USB) port, an IR interface, etc.

A monitor 2844 or other type of display device can be also connected to the system bus 2808 via an interface, such as a video adapter 2846. In addition to the monitor 2844, a computer typically includes other peripheral output devices (not shown), such as speakers, printers, etc.

The computer 2802 can operate in a networked environment using logical connections via wired and/or wireless communications to one or more remote computers, such as a remote computer(s) 2848. The remote computer(s) 2848 can be a workstation, a server computer, a router, a personal computer, portable computer, microprocessor-based entertainment appliance, a peer device or other common network node, and typically includes many or all of the elements described relative to the computer 2802, although, for purposes of brevity, only a memory/storage device 2850 is illustrated. The logical connections depicted include wired/wireless connectivity to a local area network (LAN) 2852 and/or larger networks, e.g., a wide area network (WAN) 2854. Such LAN and WAN networking environments are commonplace in offices and companies, and facilitate enterprise-wide computer networks, such as intranets, all of which can connect to a global communications network, e.g., the Internet.

When used in a LAN networking environment, the computer 2802 can be connected to the local network 2852 through a wired and/or wireless communication network interface or adapter 2856. The adapter 2856 can facilitate wired or wireless communication to the LAN 2852, which can also include a wireless AP disposed thereon for communicating with the wireless adapter 2856.

When used in a WAN networking environment, the computer 2802 can include a modem 2858 or can be connected to a communications server on the WAN 2854 or has other means for establishing communications over the WAN 2854, such as by way of the Internet. The modem 2858, which can be internal or external and a wired or wireless device, can be connected to the system bus 2808 via the input device interface 2842. In a networked environment, program modules depicted relative to the computer 2802 or portions thereof, can be stored in the remote memory/storage device 2850. It will be appreciated that the network connections shown are example and other means of establishing a communications link between the computers can be used.

The computer 2802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory machine-readable medium, comprising executable instructions that, when executed by a processor, facilitate performance of operations, comprising:
 accessing data comprising first information associated with a first electromagnetic spectrum range and second information associated with a second electromagnetic spectrum range, wherein the first electromagnetic spectrum range is substantially within a visible spectrum and the second electromagnetic spectrum range is substantially within a near non-visible spectrum; and
 generating an indication of an alert indicating detection of the second electromagnetic spectrum range substantially within the near non-visible spectrum.

2. The non-transitory machine-readable medium of claim 1, wherein the first electromagnetic spectrum range comprises a range between approximately 390 nanometers and approximately 700 nanometers.

3. The non-transitory machine-readable medium of claim 1, wherein the second electromagnetic spectrum range comprises a range of wavelengths between approximately 389 nanometers and approximately 365 nanometers.

4. The non-transitory machine-readable medium of claim 1, wherein the second electromagnetic spectrum range comprises a range of wavelengths between approximately 701 nanometers and approximately 725 nanometers.

5. The non-transitory machine-readable medium of claim 1, wherein the operations further comprise:
 adjusting the data for the visible spectrum, thereby generating a first visual image representation; and
 adjusting the data for the near non-visible spectrum, thereby generating a second visual image representation.

6. The non-transitory machine-readable medium of claim 5, wherein the operations further comprise:
 combining the first visual image representation and the second visual image representation to generate a combination image.

7. The non-transitory machine-readable medium of claim 5, wherein the second visual image representation comprises a color corresponding to a wavelength within the first electromagnetic spectrum range.

8. The non-transitory machine-readable medium of claim 5, wherein the adjusting the data for the near non-visible spectrum is performed in response to detection of a selection of a mode of a digital camera.

9. A method, comprising:
 adjusting, by a digital camera comprising a processor, data for a visible spectrum, thereby generating a first visual image representation; and
 adjusting, by the digital camera, the data for a near non-visible spectrum, thereby generating a second visual image representation, wherein the adjusting the data for the near non-visible spectrum is performed in response to detection of a selection of a mode of the digital camera.

10. The method of claim 9, further comprising:
 initiating, by the digital camera, display of a combination image that results from combining the first visual image representation and the second visual image representation.

11. The method of claim 9, wherein the data comprises first information in a first electromagnetic spectrum range within a range between approximately 390 nanometers and approximately 700 nanometers.

12. The method of claim 11, wherein the data further comprises second information in a second electromagnetic spectrum range within a range of wavelengths between approximately 389 nanometers and approximately 365 nanometers.

13. The method of claim 11, wherein the data further comprises second information in a second electromagnetic spectrum range within a range of wavelengths between approximately 701 nanometers and approximately 725 nanometers.

14. The method of claim 11, wherein the second visual image representation comprises a color corresponding to a wavelength within the first electromagnetic spectrum range.

15. The method of claim 9, wherein the first visual image representation comprises a monochromatic image representation.

16. A digital camera, comprising:
 a processor; and
 a memory that stores executable instructions that, when executed by the processor, facilitate performance of operations, comprising:
  adjusting raw data for a visible spectrum, thereby generating a first visual image representation; and
  adjusting the raw data for a near non-visible spectrum, thereby generating a second visual image representation, wherein the adjusting the raw data for the near non-visible spectrum is performed in response to detection of a selection of a mode of the digital camera.

17. The digital camera of claim 16, wherein the operations further comprise:
 initiating display of a combination image that results from combining the first visual image representation and the second visual image representation.

18. The digital camera of claim 16, wherein the raw data comprises first information in a first electromagnetic spectrum range within a range between approximately 390 nanometers and approximately 700 nanometers.

19. The digital camera of claim 18, wherein the raw data further comprises second information in a second electromagnetic spectrum range within a range of wavelengths between approximately 389 nanometers and approximately 365 nanometers.

20. The digital camera of claim 18, wherein the second visual image representation comprises a color corresponding to a wavelength within the first electromagnetic spectrum range.

* * * * *